US010999222B2

(12) United States Patent
Back et al.

(10) Patent No.: US 10,999,222 B2
(45) Date of Patent: May 4, 2021

(54) NETWORK DEVICE AND METHOD FOR SELECTING TRANSMISSION OF NETWORK DEVICE

(71) Applicant: LG ELECTRONICS INC., Seoul (KR)

(72) Inventors: Seoyoung Back, Seoul (KR); Woosuk Ko, Seoul (KR)

(73) Assignee: LG ELECTRONICS INC., Seoul (KR)

(*) Notice: Subject to any disclaimer, the term of this patent is extended or adjusted under 35 U.S.C. 154(b) by 44 days.

(21) Appl. No.: 16/471,540

(22) PCT Filed: Dec. 19, 2016

(86) PCT No.: PCT/KR2016/014894
§ 371 (c)(1),
(2) Date: Jun. 19, 2019

(87) PCT Pub. No.: WO2018/117279
PCT Pub. Date: Jun. 28, 2018

(65) Prior Publication Data
US 2019/0386935 A1    Dec. 19, 2019

(51) Int. Cl.
*H04L 12/879* (2013.01)
*H04L 12/24* (2006.01)
(52) U.S. Cl.
CPC ........ *H04L 49/901* (2013.01); *H04L 41/0806* (2013.01); *H04L 41/0813* (2013.01)
(58) Field of Classification Search
CPC ..... H04L 49/90; H04L 49/205; H04L 49/901; H04L 41/0813; H04L 47/50;
(Continued)

(56) References Cited

U.S. PATENT DOCUMENTS 5,553,061 A * 9/1996 Waggener, Jr. ..... H04L 12/5602
                                                    250/491.1
2002/0095498 A1   7/2002 Chanda et al.
(Continued)

FOREIGN PATENT DOCUMENTS

JP    2008165485    7/2008
JP    2010157782    7/2010

OTHER PUBLICATIONS

PCT International Application No. PCT/KR2016/014894, International Search Report dated Sep. 13, 2017, 3 pages.
(Continued)

*Primary Examiner* — Elton Williams
(74) *Attorney, Agent, or Firm* — Lee Hong Degerman Kang Waimey

(57) ABSTRACT

A method for selecting a transmission of a network device is disclosed. In particular, a method for selecting a transmission of a network device comprising a plurality of queues for storing data frames is disclosed. Here, each of the plurality of queues corresponds to a different traffic class, the method comprising: a step of obtaining information about a transmission selection algorithm for the plurality of queues; and a step of selecting data frames for transmission from a corresponding queue on the basis of transmission selection algorithm information. Here, the transmission selection algorithm may correspond to a strict priority algorithm, a credit-based shaper algorithm, or a burst transmission algorithm.

12 Claims, 21 Drawing Sheets

(58) Field of Classification Search
CPC . H04L 47/6215; H04L 47/24; H04L 47/2408; H04L 51/14; H04L 47/527; H04L 2021/5651; H04L 41/0806; G06F 13/28; G06F 2209/5021; G06F 9/4881; G06F 9/5038
See application file for complete search history.

(56) References Cited

U.S. PATENT DOCUMENTS

| | | | |
|---|---|---|---|
| 2002/0136230 A1* | 9/2002 | Dell | H04L 47/56 370/416 |
| 2008/0162746 A1* | 7/2008 | Ogura | G06F 13/28 710/35 |
| 2014/0071823 A1 | 3/2014 | Pannell | |

OTHER PUBLICATIONS

Imtiaz, J. et al., "A Performance Study of Ethernet Audio Video Briding (AVB) for Industrial Real-time Communication", IEEE conference on Emerging Technologies & Factory Automation, Sep. 2009, 10 pages.

* cited by examiner

FIG. 4

|  | Number of available traffic classes | | | | | | | |
|---|---|---|---|---|---|---|---|---|
| Priority | 1 | 2 | 3 | 4 | 5 | 6 | 7 | 8 |
| 0 | 0 | 0 | 0 | 0 | 0 | 1 | 1 | 1 |
| 1 | 0 | 0 | 0 | 0 | 0 | 0 | 0 | 0 |
| 2 | 0 | 0 | 0 | 1 | 1 | 2 | 2 | 2 |
| 3 | 0 | 0 | 0 | 1 | 1 | 2 | 3 | 3 |
| 4 | 0 | 1 | 1 | 2 | 2 | 3 | 4 | 4 |
| 5 | 0 | 1 | 1 | 2 | 2 | 3 | 4 | 5 |
| 6 | 0 | 1 | 2 | 3 | 3 | 4 | 5 | 6 |
| 7 | 0 | 1 | 2 | 3 | 4 | 5 | 6 | 7 |

FIG. 9

| SRP | | |
|---|---|---|
| MSRP | MVRP | MMRP |
| MRP | | |

FIG. 16

| Transmission selection algorithm | Identifier |
|---|---|
| Strict priority | 0 |
| Credit-based shaper | 1 |
| Enhanced Transmission Selection (ETS) | 2 |
| Burst Transmission | 3 |
| Reserved for future standardization | 4-254 |
| Vendor-specific Transmission Selection algorithm value for use with DCBX | 255 |
| Vendor-specific | A four-octet integer, where the most significant 3 octets hold an OUI or CID value, and the least significant octet holds an integer value in the range 0-255 assigned by the owner of the OUI or CID. |

NETWORK DEVICE AND METHOD FOR SELECTING TRANSMISSION OF NETWORK DEVICE

CROSS-REFERENCE TO RELATED APPLICATIONS

This application is the National Stage filing under 35 U.S.C. 371 of International Application No. PCT/KR2016/014894, filed on Dec. 19, 2016, the contents of which are hereby incorporated by reference herein in its entirety.

TECHNICAL FIELD

The present invention relates to a network device and a transmission selection method of the network device; and, more particularly, to a transmission selection method for efficient data output in a network device.

BACKGROUND ART

Networks such as Local Area Network (LAN) are used in various fields. Such a network may be used as an industrial network or an in-vehicle network due to advances of in-vehicle communication technology to facilitate development of recent smart cars.

DISCLOSURE

Technical Problem

Data transmission in a network needs to be handled efficiently according to a target application or intended use of the data. In addition, data transmission in a network has to be determined by taking into account characteristics of a station, which receives the data.

Technical Solution

To solve the technical problem above, the present invention proposes a network device and a transmission selection method of the network device.

A network device according to one embodiment of the present invention may comprises a plurality of queues, which store at least one data frame, and a processor connected to the plurality of queues. Here, the plurality of queues may correspond to the respective traffic classes. In one embodiment, the processor may obtain information about a transmission selection algorithm for a plurality of queues and select a data frame for transmission from the corresponding queue based on information of the transmission selection algorithm. In one embodiment, the transmission selection algorithm may correspond to strict priority algorithm, credit-based shaper algorithm, or burst transmission algorithm.

In one embodiment, when the transmission selection algorithm allocated to the plurality of queues is burst transmission algorithm, the selecting a data frame for transmission from the corresponding queue may comprise reconfiguring each of the plurality of queues into one pair of sub-queues, wherein the one pair of sub-queues have different operation status; determining whether one of sub-queues in a write status satisfies a pre-configured status-change condition; if the one sub-queue satisfies the pre-configured status-change condition, changing operation status of the entire sub-queues; and selecting data frames for transmission of burst data from sub-queues which have been changed to a read status.

In one embodiment, the selecting data frames for transmission from sub-queues which have been changed to a read status may comprise: selecting all of first data frames stored in a sub-queue corresponding to a first traffic class for transmission; and after the first data frames are selected for transmission, selecting all of second data frames stored in a sub-queue corresponding to a second traffic class, wherein the first traffic class has the highest priority, and the second traffic class has a lower priority than the first traffic class.

In one embodiment, the processor is configured to determine that the status-change condition is satisfied if one of the sub-queues in the write status is completely filled with the data frames.

In one embodiment, the processor is configured to change the operation status of the entire sub-queues only when one of the sub-queues in the write status satisfies the pre-configured status-change condition within a pre-configured time period.

In one embodiment, the one pair of sub-queues may have the same size with each other.

In a transmission selection method of a network device according to one embodiment of the present invention, the network device may include a plurality of queues storing data frames, and the plurality of queues may correspond to the respective traffic classes. The transmission selection method of the network device may comprise obtaining information about a transmission selection algorithm for a plurality of queues; and selecting a data frame for transmission from the corresponding queue based on information of the transmission selection algorithm, wherein the transmission selection algorithm may correspond to strict priority algorithm, credit-based shaper algorithm, or burst transmission algorithm.

In one embodiment, when the transmission selection algorithm allocated to the plurality of queues is burst transmission algorithm, the selecting a data frame for transmission from the corresponding queue may comprise reconfiguring each of the plurality of queues into one pair of sub-queues, wherein the one pair of sub-queues have a different operation status; determining whether one of sub-queues in a write status satisfies a pre-configured status-change condition; if the one sub-queue satisfies the pre-configured status-change condition, changing operation status of the entire sub-queues; and selecting data frames for transmission of burst data from sub-queues which have been changed to a read status.

In one embodiment, the selecting data frames for transmission from sub-queues which have been changed to a read status may comprise: selecting all of first data frames stored in a sub-queue corresponding to a first traffic class for transmission; and after the first data frames are selected for transmission, selecting all of second data frames stored in a sub-queue corresponding to a second traffic class, wherein the first traffic class has the highest priority, and the second traffic class has a lower priority than the first traffic class.

In one embodiment, the network device may determine that the pre-configured status-change condition is satisfied if one of the sub-queues in the write status is completely filled with the data frames.

In one embodiment, the network device may change the operation status of the entire sub-queues only when one of the sub-queues satisfies the pre-configured status-change condition within a pre-configured time period.

In one embodiment, the one pair of sub-queues may have the same size with each other.

Advantageous Effects

A network device of the present invention transmits data by using a transmission selection method for transmission of data according to a target application or intended use of a network, thereby improving efficiency of data processing.

A network device of the present invention determines and uses a data transmission selection method by taking into account characteristics of a data-receiving station, thereby enabling the corresponding station to maintain expected performance.

A network device of the present invention provides a transmission selection method for transmission of burst data, thereby enabling energy-efficient processing in a data-receiving station.

In what follows, additional effects of the present invention will be described together with composition of the invention.

DESCRIPTION OF DRAWINGS

FIG. 4 illustrates a mapping relationship between priorities and traffic classes according to one embodiment of the present invention.

FIG. 9 illustrates architecture for stream registration and reservation of FIG. 8.

FIG. 16 illustrates a transmission selection algorithm table according to one embodiment of the present invention.

MODE FOR INVENTION

In what follows, preferred embodiments of the present invention are described in detail with reference to appended drawings. Detailed descriptions with reference to appended drawings are not applicable only to the embodiments, which may be implemented according to the present invention but rather intended to describe preferred embodiments of the present invention. The following descriptions given below include specific details for a thorough understanding of the present invention. However, it is apparent for those skilled in the art that the present invention may be implemented without involving the specific details.

Most of terms used in the present invention have been chosen among the terms widely accepted in the corresponding field. However, some of the terms are selected arbitrarily by the applicant and their meaning will be described in detail in the following descriptions if needed. Therefore, the present invention should be understood not by the apparent names or immediate meanings of the terms but by the intended meanings of the terms.

The present invention relates to a network device, which may perform the whole or part of functions of a station (or system) constituting a network such as the Institute of Electrical and Electronics Engineers (IEEE) 802 network. In one embodiment, a network device 1700 may correspond to a bridge within a bridged network of the IEEE802.1 or a device which includes the bridge or which belongs thereto. For example, a network device may correspond to a bridge implemented according to the IEEE802.1D or IEEE802.1Q or a device (or system) belonging to the bridge or including the bridge. In one embodiment, a network device may perform a connectivity function for devices (or networks). In one embodiment, a network device may be a device constituting an in-vehicle network. In the present specification, a network device may be called a bridged network.

Figure 1:
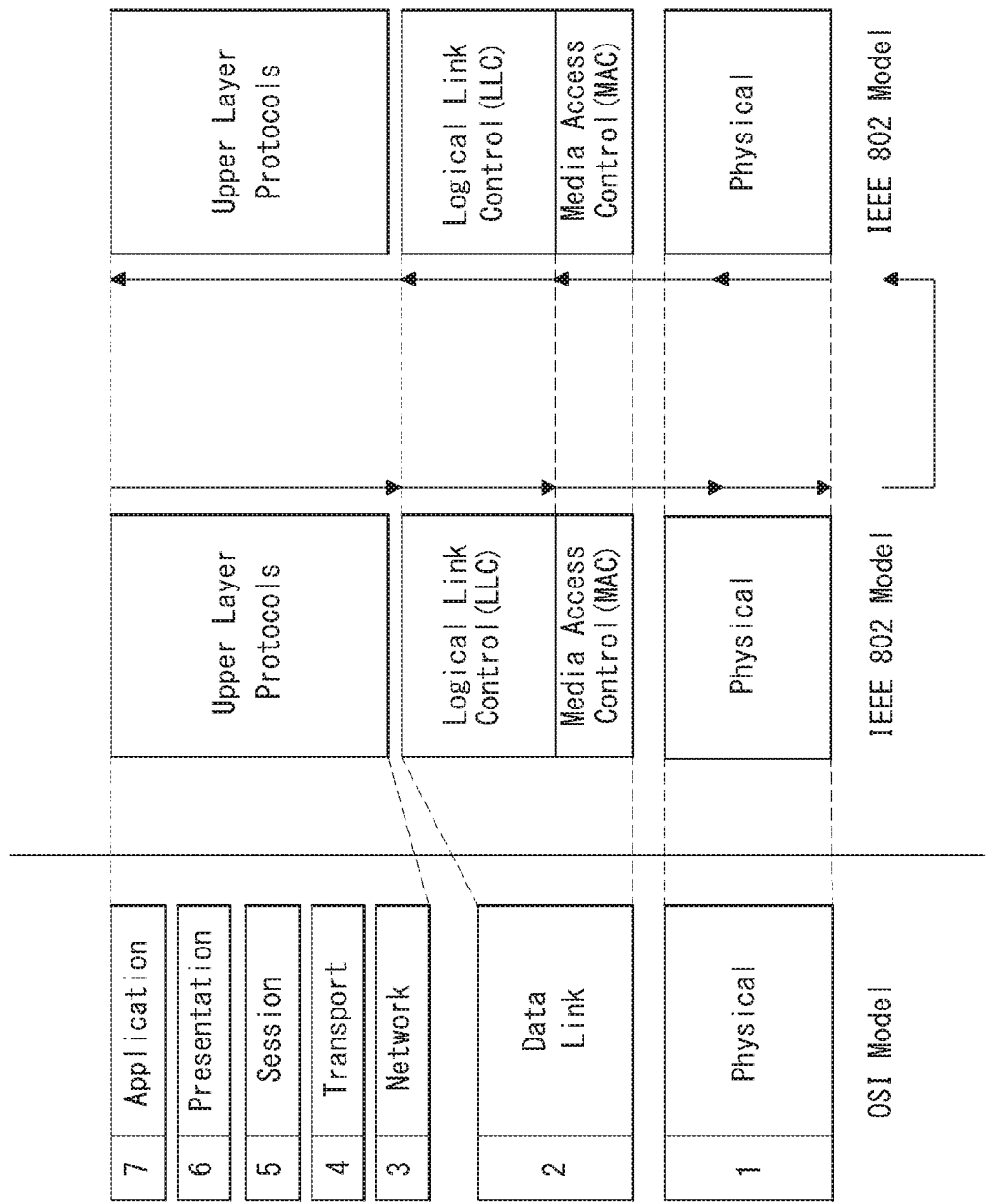
FIG. 1 illustrates a network model according to one embodiment of the present invention.

FIG. 1 illustrates a network model according to one embodiment of the present invention. More specifically, FIG. 1 compares a network model according to one embodiment with the Open System Interconnection (OSI) 7 layer. For example, the network model of FIG. 1 illustrates reference architecture of a station (for example, a bridge or end station) within a network based on the IEEE802.

The OSI 7 layer model shown in the left of FIG. 1 is a basic model (or reference model) of a standard network structure developed by the International Standard Organization (ISO), which defines a process ranging from connection for network communication to completion thereof into seven layers. This model works as a reference guideline for various network communication protocols but does not correspond to an industry standard that actually has to be obeyed. Functions of individual layers of the OSI 7 layer model may be described briefly in an order from a lower layer to an upper layer as follows.

First, the physical layer is a physical medium used when network data are transmitted, which establishes and terminates a connection; provides shared communication resources, and converts an analog signal to a digital signal or vice versa. The physical layer may also be called layer 1.

The data link layer performs the function of data transmission between physical networks. One of primary purposes of the data link layer is to provide an address designation system used for identifying physical devices and to provide an error checking mechanism to ensure that data has not been modulated. The data link layer may be called layer 2.

The network layer performs a routing function between physical networks, and routers operate in this layer. Also, the network layer may perform functions such as managing logical addresses (for example, IP addresses) of network hosts, identifying a protocol by segmenting packets, and detecting an error. The network layer may be called layer 3.

The transport layer provides a connection-oriented protocol and a non-connection oriented protocol, and firewalls and proxy servers operate in this layer. One of primary purposes of the transport layer is to ensure reliable data transmission to lower layers. In other words, the transport layer is designed mainly to guarantee node-to-node error-free transmission. The transport layer may be called layer 4.

The session layer performs a function of managing sessions or dialogues between two computers. The session layer provides a function for connecting, managing, and terminating all of communication equipment, function for preventing instantaneous loss of a connection and terminating a connection between hosts properly, function for determining whether a connection is unilateral or bilateral, and so on. The session layer may be called layer 5.

The presentation layer performs a function of encoding and decoding data transmitted or received to and from the upper application layer. In addition, the presentation layer may include a few encryption and decryption formats for safe use of data. The presentation layer may be called layer 6.

The application layer provides a function for accessing network resources by the user. The application layer provides all of basic interfaces for network activities, which typically corresponds to a unique layer exposed to the user. The application layer may be called layer 7.

In this way, if a network structure is partitioned into separate layers, since protocols operating in the respective layers are independent of each other, an advantage is obtained that protocols may be designed and analyzed easily. Meanwhile, a network system, even if it follows the OSI 7 layer model, does not necessarily have to include all the layers described above for proper operation of the system, and part of the layers may be omitted or modified.

The central and right part of FIG. 1 shows a network model according to one embodiment of the present invention (hereinafter, "network model"). As described above, the network model may be a model of a standard network defined by the Institute of Electrical and Electronics Engineers (IEEE). The IEEE802 network model is based on the OSI 7 layer model, which, for example, may be a network model composed of one or more interconnected networks using the Media Access Control (MAC) protocol specific to the IEEE802 standard. The IEEE802 network model mainly emphasizes lower two layers of the OSI 7 layer model, namely physical and data link layers. In what follows, each layer of a network model will be described with respect to the case where the network is based on the IEEE802 network model.

As shown in the central and right part of FIG. 1, the network model may include a physical layer corresponding to the physical layer of the OSI 7 layer model, data link layer corresponding to the data link layer thereof, and layers corresponding to the layers of the OSI 7 layer model ranging from the network layer up to the highest, application layer. Here, the layers corresponding to the layers of the OSI 7 layer model ranging from the network layer up to the highest, application layer may be called collectively upper layers (or upper layer protocols). The layers may perform the same or similar functions of the corresponding layers, except for those specified particularly in the corresponding standards.

In one embodiment, the data link layer of the network model may be further divided into the Logical Link Control (LLC) sublayer and Media Access Control (MAC) sublayer. Depending on embodiments, the MAC sublayer may include part of the physical layer.

The LLC sublayer performs the function of connecting the MAC sublayer to an upper layer and performs the role of compensating for a difference between topologies of the MAC sublayer. In other words, the LLC sublayer may perform the role of enabling data transmission irrespective of the MAC topology of a communication network.

The MAC sublayer may perform the function of connecting the physical layer and the LLC sublayer above the physical layer; and may perform the function of enabling frameless data transmission between stations. In addition, the MAC sublayer prevents a plurality of stations from colliding with each other when a transmission medium with a limited capacity is employed, thereby providing communication with high reliability. The topology (or media access method) of the MAC sublayer may include a token bus, token ring, or CSMA/CD, for example. Other functions of the MAC sublayer may include a function for flow control between a connectivity device such as a bridge and an end station and a function for forwarding frames according to a destination address.

As shown in the center part of FIG. 1, when a receiver-side station transmits data, data may be processed in the descending order as it goes down from the highest layer to the lowest layer, the physical layer, one after another. At this time, encapsulation is performed while data is relayed down to lower layers, where, in general, each layer adds a header and/or tail including specific information to the data received from the layer above and then relays the data to the layer below. The data relayed in this manner may be transmitted to a transmitter-side station through physical layer processing.

As shown in the right part of FIG. 1, when a transmitter-side station receives data, data may be processed in the ascending order as it goes up from the lowest layer, the physical layer, to the highest layer, one after another. At this time, decapsulation is performed while data is transmitted to upper layers, where, in general, each layer analyzes and processes a header and tail from the data received from the layer below and then relays the data the header and tail of which have been removed to upper layers. If each layer processes data in this manner, the final application layer may receive only the initially generated, original data. In what follows, the data handling processes between the separate layers will be described in detail with reference to FIG. 3.

The present specification describes various embodiments of the present invention with respect to the data link layer among the layers of the network model described above. For example, the present specification describes bridges within a bridged network, which perform the whole or part of the functions of the data link layer of the IEEE 802 network.

In the present specification, a bridged network denotes a concatenation of networks interconnected by bridges, and the bridge denotes a device (or station) which connects networks in the bridged network. For example, a bridged network may be a concatenation of individual IEEE 802 LANs interconnected by bridges, and the bridge may be an MAC bridge or Virtual LAN (VLAN) bridge following the IEEE802.1D or IEEE802.1Q. The MAC bridge or VLAN bridge will be described in detail with reference to FIG. 5.

Figure 2:
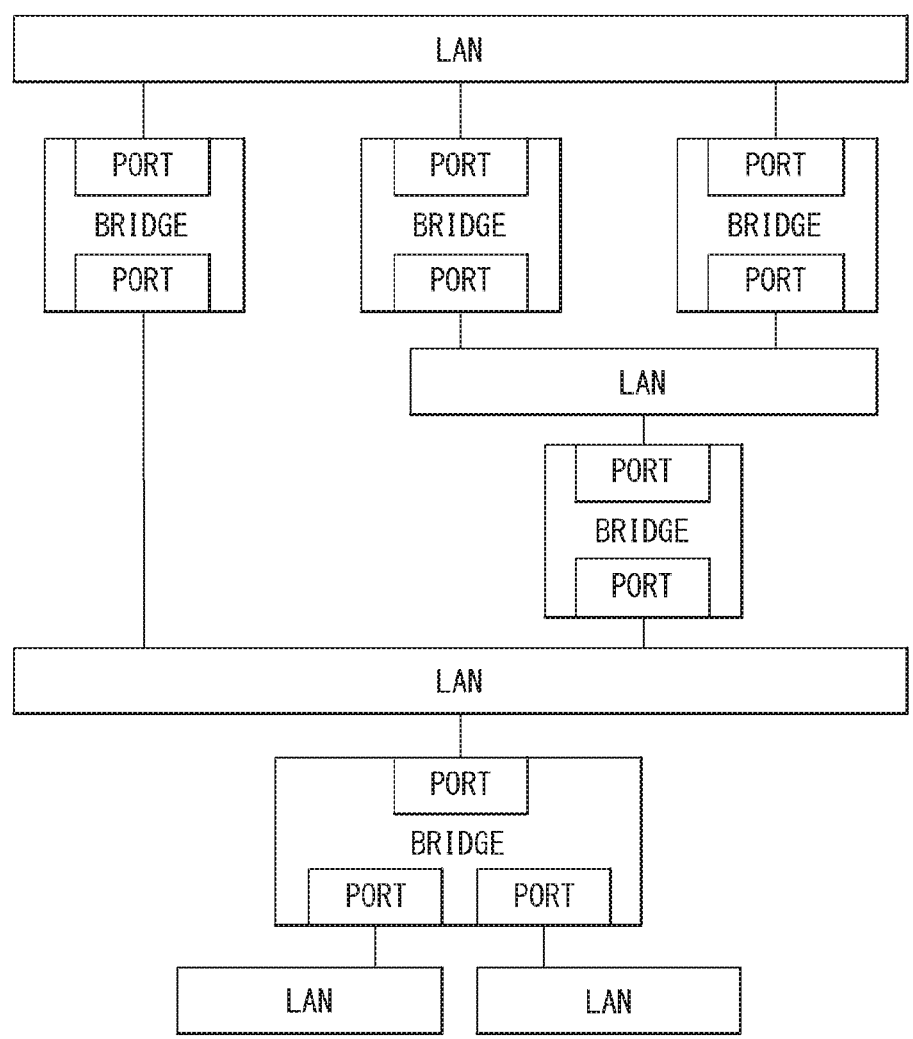
FIG. 2 illustrates a bridged network according to one embodiment of the present invention.

FIG. 2 illustrates a bridged network according to one embodiment of the present invention. More specifically, FIG. 2 illustrates a physical topology of a bridged network including bridges, which perform the whole or part of the functions of the data link layer of the network model of FIG. 1. In the embodiment of FIG. 2, a bridged network may be a network including MAC bridges or VLAN bridges following the IEEE802.1D or IEEE802.1Q.

As shown in FIG. 2, a bridged network may include LANs and bridges. A bridge may include two or more bridge ports. Each bridge port may attach a LAN to the bridge and provide bidirectional connectivity for data frames (for example, MAC frames). In other words, each bridge may connect two LANs by transferring frames through a bridge port. Each LAN may be connected to all of the other LANs through a bridge or connected to bridges together with zero or more other LANs.

In one embodiment, a bridged network may be a virtual bridged network including VLAN bridges. Here, a virtual bridged network may be a bridged network, which concatenates individual IEEE LANs interconnected to each other by bridges including VLAN bridges compliant with the IEEE802.1Q. In one embodiment, a virtual bridged network may construct several VLANs by using VLAN identifiers (IDs) within a frame to be transmitted. In the present specification, a virtual bridged network may also be called a VLAN bridged network or VLAN network.

When a bridged network is a virtual bridged network, a single VLAN bridge may connect a plurality of individual VLANs (or LANs) to each other. However, in this case, too, data transfer through a VLAN bridge is possible only among the same VLANs, and to transmit data to a different VLAN, a router operating in an upper layer has to be used. In one embodiment, whether individual VLANs are the same to each other may be determined by VLAN identification information allocated to each VLAN. For example, a VLAN bridge may determine whether interconnected VLANs are identical to each other by using VLAN identification information such as VLAN ID information (or field) included in a VLAN tag of an input data frame and allow data exchange only among the same VLANs. The structure of the bridged network and individual bridges as described above and operating principles thereof will be described with reference to FIG. 5.

In what follows, embodiments of the present invention will be described mainly with reference to the case where bridges and bridged network are VLAN bridges and VLAN bridged network following the IEEE 802.1Q. However, the embodiments are merely an example introduced for the convenience of descriptions, and the same or similar descriptions may be applied to other bridges (for example, MAC bridges) and bridged networks following the IEEE 802.1 except for a specific case limited to the VLAN.

Figure 3:
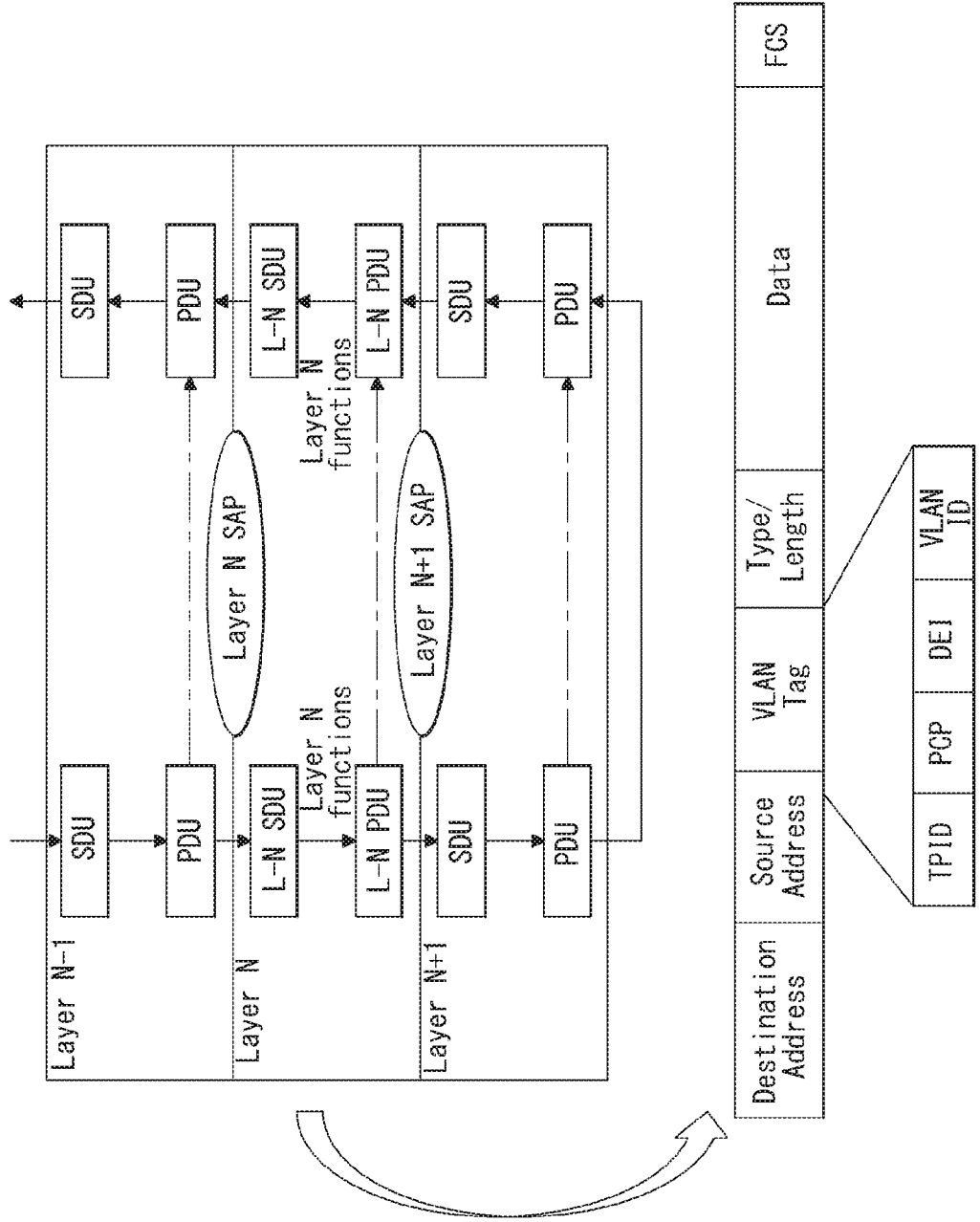
FIG. 3 illustrates a method for transmitting data between layers of the network model of FIG. 1.

FIG. 3 illustrates a method for transmitting data between layers of the network model of FIG. 1. In particular, FIG. 3 illustrates a method for the MAC sublayer (or MAC layer) of the network model of FIG. 1 to relay data received from an upper layer to a lower layer.

When data are exchanged between layers, necessary information may be added or information no longer needed may be removed, which is called an encapsulation/decapsulation process. For example, encapsulation is performed when data (or information) is relayed from an upper layer to a lower layer at a transmitter-side station while decapsulation may be performed when data (or information) is relayed from a lower layer to an upper layer at a receiver-side station.

As shown in the upper part of FIG. 3, in each layer, a station at the transmitter-side may generate a Protocol Data Unit (PDU), which is a kind of datatype that may be relayed to a lower layer, by performing the encapsulation process of adding necessary information for a Service Data Unit (SDU) based on the protocol of the corresponding layer. Here, an SDU refers to the information relayed between layers or sublayers. Contrary to the description above, in each layer, a station at a receiver-side may generate an SDU, which is a kind of datatype that may be relayed to an upper layer, by performing the decapsulation process of obtaining necessary information from the PDU based on the protocol of the corresponding layer.

As an embodiment, when layer N is the MAC sublayer of the network model of FIG. 1, the station may perform encapsulation in the layer N on the SDU (L-N SDU) received from the LLC sublayer (layer N-1), which is the upper layer, generate PDU (L-N PDU), and relay the generated PDU to the physical layer (layer N+1), which is the lower layer. The PDU (L-N PDU) generated at the layer N may have a frame format as shown in the lower part of FIG. 3. In other words, the PDU of the MAC sublayer of the network model (for example, Ethernet) of FIG. 1 may have a frame format which is the same as shown in the lower part of FIG. 3. In the present specification, the L-N PDU may also be called the PDU of the Ethernet MAC layer, MAC PDU, or MAC frame; and the frame format of the L-N PDU may also be called the Ethernet frame format or MAC frame format.

As shown in the lower part of FIG. 3, the MAC PDU may comprise a destination address field, source address field, type filed, length field, data field and/or Frame Check Sequence (FCS) field. In the present specification, except for the data field, each individual field may also be called a control field.

The destination address field includes destination address information of the MAC, and the source address field includes the source address information of the MAC. In the present specification, the destination address field may be called a destination field, and the source address field may be called a source field.

The type field includes type information of an upper layer protocol. For example, the type field may provide the type information of the protocol of the LLC sublayer (or layer). The length field includes information about the length of the data field. As an embodiment, the length field may express the length of data within the data field in terms of octets. In one embodiment, the type field and length field may be merged into one single field (for example, type/length field).

The data field includes data received from an upper layer. For example, the data field may include the SDU received from the LLC sublayer (or layer). The FCS field, which is a field containing information for error detection, may be inserted into the end part of a frame for error detection at the receiver side. In the present specification, the data field may be called a payload.

As an embodiment, the MAC PDU may further include a VLAN tag field. For example, when a bridged network is a VLAN bridged network, which includes VLAN bridges, the MAC PDU may further include a VLAN tag field.

The VLAN tag field is an optional tag, which may exist depending on whether the VLAN is supported or not. As an embodiment, the VLAN tag field may include a Tag Protocol Identifier (TPID) field, Priority Code Point (PCP) field, Drop Eligible Indicator (DEI) field and/or VLAN ID (VLAN Identifier) field. As an embodiment, the VLAN tag field may be located before the type/length field or included within the type/length field, but the present invention is not limited to the specific embodiment.

The TPID field includes protocol ID information of a VLAN tagged frame. For example, when the corresponding frame is a VLAN tagged Ethernet frame (or MAC frame), the TPID may have a fixed value (for example, in the case of a customer network, 0x8100). Depending on the existence of the TPID field having a fixed value, whether the corresponding frame supports a VLAN tag may be determined. As an embodiment, the TPID field may be located at the very beginning of the VLAN tag field, but the present invention is not limited to the specific embodiment.

The PCP field may include information about the priority of the corresponding field, where the priority information may be associated with (or mapped to) the traffic class. As an embodiment, the PCP field may be composed of a 3-bit field, by which priorities of eight frames may be expressed. As an embodiment, each bridge port of a bridge may include a plurality (for example, 8) of outbound queues. Here, an outbound queue refers to a queue (or buffer) used for outputting data and data frames from an output port of the bridge. The outbound queue may be mapped one-to-one to traffic classes. Therefore, the value of a PCP field may be used for determining to which queue among a plurality of outbound queues the corresponding frame has to be stored, which will be described in detail with reference to FIG. 4.

The DEI field includes information indicating whether a frame may be removed when the corresponding frame satisfies a pre-configured condition. For example, the DEI field may include information indicating whether the current frame may be removed when the amount of data has increased to render the traffic in a congestion status.

The VLAN ID field shows the ID of a VLAN to which the corresponding frame belongs. By using the VLAN ID field, data transmission may be made to be performed only between devices having the same VLAN ID in a VLAN bridged network. In the present specification, the VLAN ID may be referred to as VID.

In one embodiment, the value of the destination address field and the value of the VLAN ID field may be used to determine a bridge port (for example, an output bridge port) of the bridge, and the value of the PCP field may be used to determine to which queue (for example, an outbound queue) of the determined bridge port to store data frames. In addition, the PCP field and the DEI field may become the elements, which determine Quality of Service (QoS).

In the embodiment above, only the embodiment where the MAC PDU includes the VLAN tag field has been described; however, depending on embodiments, a tag field required according to the type (provider network, backbone network, or customer network) of a network to which the MAC PDU is transmitted may be included together with the VLAN tag field or may be included by replacing the VLAN tag field.

In the receiver side, a station may receive a PDU (L–N PDU) at layer N including the aforementioned fields from the physical layer (layer N+1), which is the lower layer, perform decapsulation on the received PDU, obtain various pieces of information, generate an SDU (L–N SDU), and forward the generated SDU to the LLC sublayer (layer N–1), which is the upper layer. Also, the station may perform various operations performed in the corresponding layer based on the obtained information.

FIG. 4 illustrates a mapping relationship between priorities and traffic classes according to one embodiment of the present invention. In the embodiment of FIG. 4, the horizontal axis represents the number of available traffic classes, and the vertical axis represents priorities. The mapping relationship between the priority and traffic class shown in the embodiment of FIG. 4 is one of illustrative mapping relationships, which may be modified arbitrarily by the user of the network. The table that illustrates a mapping relationship between the priority and traffic class as shown in the embodiment of FIG. 4 may be referred to as a priority-class mapping table. As an embodiment, a bridge may have a priority-class mapping table for each bridge port.

In the present specification, a traffic class refers to classification used to expedite transmission of frames. Also, an outbound queue refers to the queue (or buffer) used for outputting data and data frames from an output port of a bridge. Also, a frame (or data frame) refers to the unit of data transmitted. In the present specification, a queue may also be referred to as a buffer.

As described above, the value of the PCP field represents the priority of the corresponding frame, which may be associated with (or mapped to) the traffic class values corresponding to the respective queues of an output port of the bridge. Therefore, the value of the PCP field may be used to determine to which queue to store the corresponding frame among the queues of the output port. For example, a bridge may obtain priority information from the PCP field within a received frame, check the traffic class mapped to the corresponding priority by referring to the priority-class mapping table, and store the corresponding frame in a queue associated with the corresponding traffic class.

The data frame fed to an input port of the bridge, if its destination is known accurately, may be forwarded directly to a desired output port, otherwise the data frame may be forwarded to all of the other ports except for the input port. It has to be determined to which queue to store the frame forwarded to the output port among queues within the output port; at this time, a value of a traffic class associated with the value of the PCP field may be used. To this purpose, for example, a priority-class mapping table as shown in Table 4 has to be configured in advance.

As described above, since the PCP field is composed of a 3-bit field, each frame input to a bridge may have one of eight priorities. Also, each bridge port may have one up to eight queues (or outbound queues), and each outbound queue may be mapped one-to-one to an allocated traffic class. In this case, the value of the traffic class may range from 0 to N–1. Here, N represents the number of outbound queues of the corresponding port. For example, when the number of available queues of a bridge port is 3, the value of an available traffic class at the corresponding bridge port may be 0, 1, 2. In other words, only three types of traffic classes may be used. At this time, it may be determined so that a queue corresponding to a lower traffic class has a lower priority. For example, a queue that corresponds to the traffic class 0 may have the lowest priority. However, depending on embodiments, the priority may be determined so that it has a lower value as the value of the traffic class becomes higher.

In the table of FIG. 4, the shaded part shows a mapping relationship between the traffic class and the priority when the number of available traffic classes is 3. In other words, the table shows an illustrative mapping relationship between the PCP having 8 code values (or priority values) and a traffic class having three class values. Referring to the corresponding part, since a frame whose priority (or PCP code value) ranges from 0 to 3 has a value of 0 for the traffic class, the frame may be stored in the first queue of the bridge port. Also, since a frame whose priority (or PCP code value) ranges from 4 to 5 has a value of one for the traffic class, the frame may be stored in the second queue of the bridge port. Also, since a frame whose priority (or PCP code value) ranges from 6 to 7 has a value of two for the traffic class, the frame may be stored in the third queue. A description similar to the one given above may also be applied to a mapping relationship between the traffic class and the priority when the number of available traffic classes is different from 3.

As an embodiment, a frame stored in each queue may have a different traffic type. In other words, frames stored in a different queue may have a different traffic type. Here, the traffic type may include three types of traffic: for example, Best-Effort (BE) traffic, Rate Constrained (RC) traffic, and Time Trigger (TT) traffic.

BE traffic (or frame) is a traffic type having a low priority, for which timing or latency may not be guaranteed. In other words, when frames stored in a plurality of queues are output sequentially through one output port, BE traffic may be transferred with a delay without time guarantees or may not be transferred at all in the event of congestion.

RC traffic (or frame) may be guaranteed to have transmission bandwidth by using a minimum time interval between frames and the largest frame size. In the case of RC traffic, transmission time is guaranteed within the guaranteed bandwidth, and transmission is possible without loss of frames in the event of congestion. However, since the guaranteed overall transmission delay is large, RC traffic is suitable for transmission of audio and video data but not suitable for time-sensitive industrial control or automotive applications TT traffic (or frame) has a structure in which frames are transmitted directly without interference from other frames within a given time period, which is free from frame loss and is characterized by short transmission time. TT traffic may be suitable for control signals with a demanding requirement on time sensitivity. For example, TT traffic may be suitable for time-sensitive industrial control or automotive applications.

When the traffic types are associated with the traffic classes shown in the shaded part of Table 4 above, for example, the outbound queue storing frames of traffic class 0 may be used for transmitting BE traffic, the outbound queue storing frames of traffic class 1 may be used for transmitting RC traffic (for example, traffic of audio or video-related frames), and the outbound queue storing frames of traffic class 2 may be used for transmitting TT traffic (for example, traffic of frames related to automotive applications or control signals for factory automation).

Figure 5A:
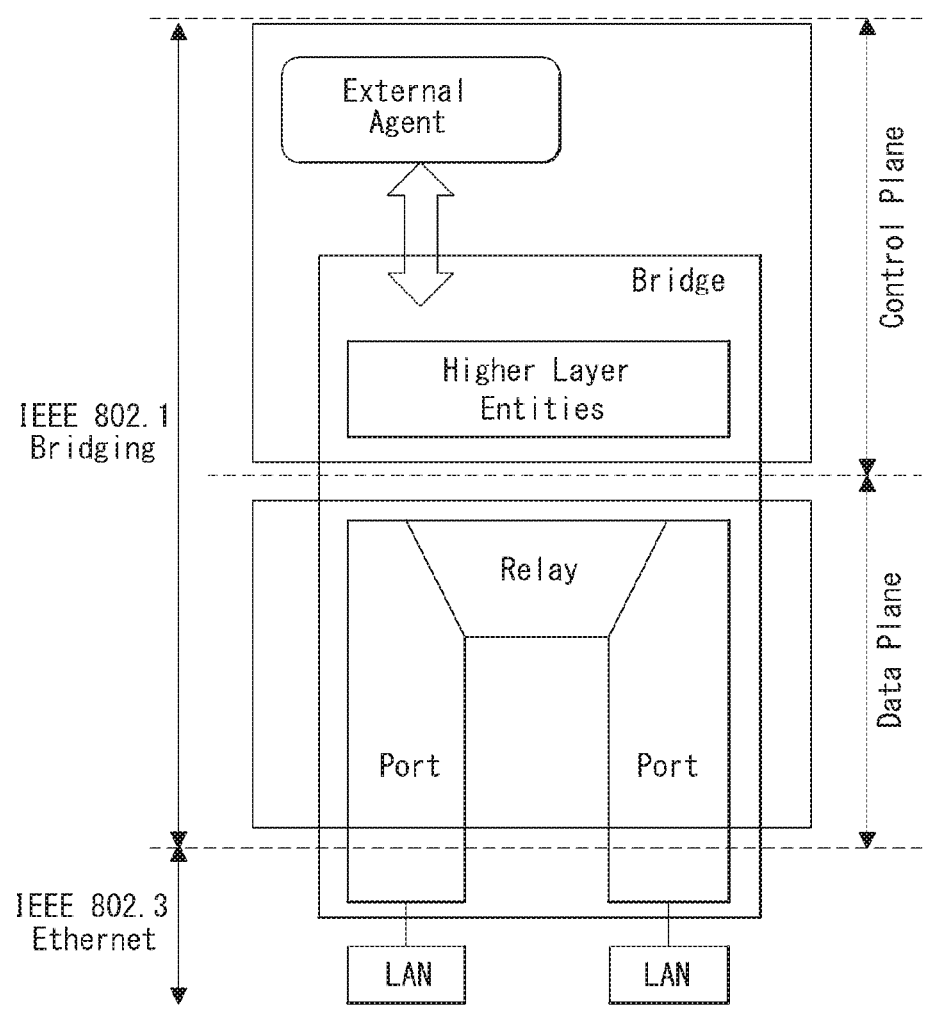
FIG. 5 illustrates bridge architecture according to one embodiment of the present invention.
Figure 5B:
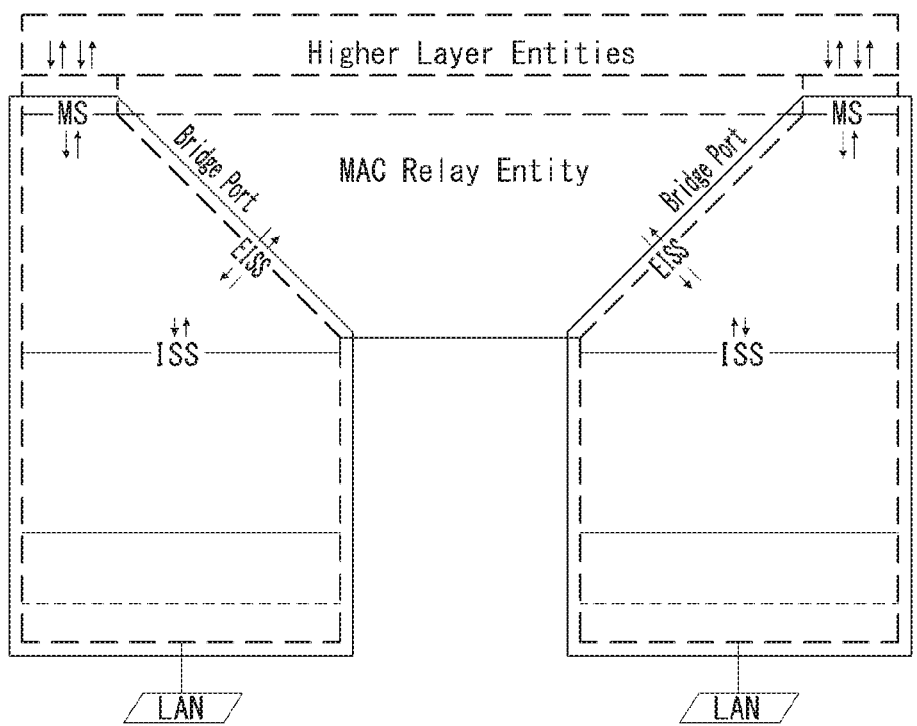
Figure 5C:
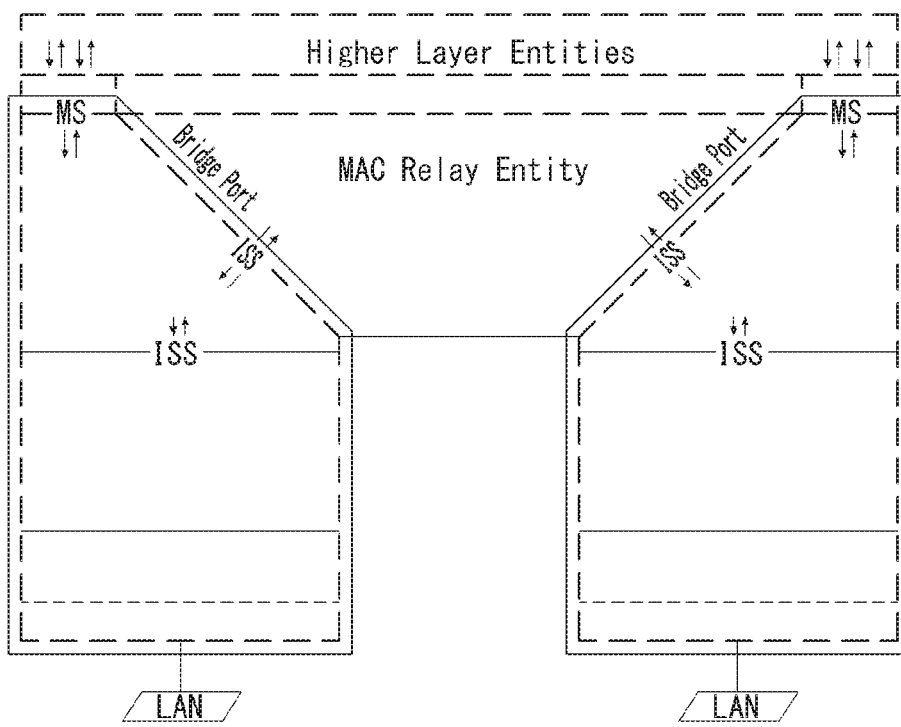

FIG. 5 illustrates bridge architecture according to one embodiment of the present invention. More specifically, FIG. 5(a) illustrates bridge architecture according to one embodiment of the present invention, FIG. 5(b) illustrates a first example of the bridge architecture, and FIG. 5(c) illustrates a second example of the bridge architecture. As an embodiment, the bridge architecture of FIG. 5 may follow the IEEE802.1 specification. For example, the bridge architecture may be the architecture for the MAC bridge or VLAN bridge compliant with the IEEE802.1D or IEEE802.1Q standard.

Referring to FIG. 5(a), a bridge includes at least one bridge component. As an embodiment, a bridge may include at least two ports, MAC relay entity (or relay entity) and/or upper layer entities.

Of at least two bridge ports, the port through which incoming data is received from the LAN is called an ingress port (or input port), and the port through which outgoing data is transmitted to the LAN is called an egress port (or output port). As an embodiment, an ingress port may perform functions related to filtering or drop, (un)tagging, VID translation and/or (de)encapsulation. As an embodiment, an egress port may perform functions related to filtering, (un)tagging, VID translation, (de)encapsulation, metering, queuing, or transmission selection.

The relay entity refers to an entity, which interconnects bridge ports. As an embodiment, a relay entity may perform functions of relaying frames between bridge ports, filtering frames and/or learning filtering information. In the present specification, the relay entity may be called an MAC relay entity.

Upper layer entities refer to the protocols, which determine a network through which data is communicated. Upper layer entities will be described in detail with reference to FIG. 6.

As an embodiment, the bridge component may be included in the control plane or data plane depending on its function. For example, upper layer entities may be included in the control plane while bridge ports and relay entities may be included in the data plane.

In one embodiment, an external agent may be further included in the control plane. Here, an external agent refers to the control provided from the outside instead of a protocol already provided by the upper layer entities. For example, an external agent may be a well-known Software Defined Network (SDN) controller. Through the external agent, a software-based controller may control and manage data transfer and operation of the bridge.

The bridge architecture of FIG. 5(b) may be the architecture of the MAC bridge. As an embodiment, the MAC bridge refers to a bridge which is implemented according to the IEEE802.1D or IEEE802.1Q standard and which does not recognize VLAN tagged frames. In other words, the MAC bridge refers to the bridge incapable of recognizing a VLAN tag included in the frame.

As an embodiment, the MAC bridge may include at least one MAC bridge component, which provides a function of supporting an Internal Sublayer Service (ISS) at each bridge port and a function of relaying frames between bridge ports. For example, as shown in FIG. 5(b), to perform the aforementioned functions, the MAC bridge may include at least two ports, relay entity and/or upper layer entities.

Here, an ISS is a service provided by an internal layer of the MAC sublayer, providing basic functions of the MAC service such as data transmission among a plurality of Service Access Points (SAPs) and relaying of data frames between bridge ports.

In general, when an upper layer calls a lower layer for data or vice versa, inter-layer communication may be performed by relaying primitives through the Service Access Point (SAP) or receiving the primitives. And in a layered structure including the MAC sublayer, each layer should be able to operate independently from a media access method. To this purpose, as described above, whichever media access method is used, the MAC sublayer should be able to process the method, and the ISS performs the role of determining primitives of the SAP. As an embodiment, the ISS may compose a primitive by using parsed data received from the physical layer and data used locally.

In one embodiment, the primitive of an ISS may include such parameters as destination_address, source_address, Mac_Service_Data_Unit (MSDU), priority, Drop_Eligible (DE), Frame_Check_Sequence (FCS), Service_Access_Point_identifier (SAP identifier) and/or connection_Identifier. Here, the destination address, source address, MSDU, priority, DE, and FCS parameters are the same as described with reference to FIG. 4. Also, the SAP identifier represents the ID of a bridge port used in a relay entity, and the connection identifier represents a connection in the MAC sublayer, for example, identification (or distinction) of a connection like a transmission connection for transmitting data (or data frames). The connection identifier is important for such a case when the number of SAPs is one, and for other cases, the connection identifier may be set to null.

As an embodiment, the destination address, source address, MSDU, priority, DE, and FCS parameters may be obtained by parsing a frame received from the physical layer, and the SAP identifier and connection identifier parameters may be used internally (or locally).

The bridge architecture of FIG. 5(c) may be the architecture of a VLAN bridge, for example. As an embodiment, the VLAN bridge refers to a bridge which is implemented according to the IEEE802.1D or IEEE802.1Q and which may recognize, insert, and remove VLAN tags. In other words, different from the MAC bridge, the VLAN bridge refers to a bridge, which recognizes VLAN tags included in a frame.

As an embodiment, the VLAN bridge may include VLAN bridge components, which provide a function of supporting an Enhanced Internal Sublayer Service (EISS) at each bridge port and a function of relaying frames between bridge ports. For example, as shown in FIG. 5(b), to perform the aforementioned functions, the VLAN bridge may include at least two ports, relay entity and/or upper layer entities.

The EISS is an enhanced internal layer service provided by the MAC sublayer; to provide more enhanced services than the ISS, for example, to provide services such as recognition, insertion, and removal of VLAN tags, the EISS may further include components and parameters required for operation of the VLAN bridge. As an embodiment, primitives of the EISS may further include parameters such as a VLAN identifier (vlan_identifier), flow hash (flow_hash) and/or time-to-alive (time_to_alive) in addition to the aforementioned primitives of the ISS.

Here, the VLAN identifier parameter represents the ID of a VLAN to be transferred, which may be known through the frame received from the physical layer. Also, the flow hash parameter refers to the parameter used to determine which port to use among various ports capable of forwarding when a forwarding process is performed. Also, the time-to-alive parameter is the parameter used to determine how long a frame will remain alive through network hops, and as an embodiment, null value may be given as a value of the corresponding parameter.

Figure 6:
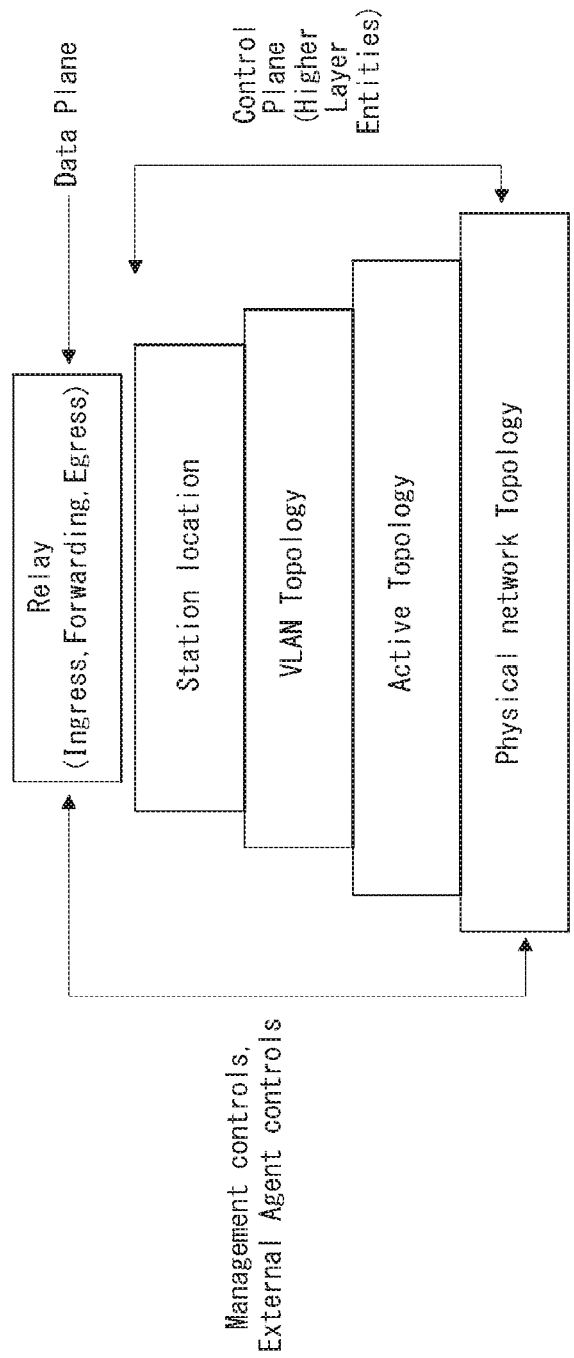
FIG. 6 illustrates upper layer entities of a control plane according to one embodiment of the present invention.

FIG. 6 illustrates upper layer entities of a control plane according to one embodiment of the present invention. More specifically, FIG. 6 illustrates upper layer entities of the control plane comprising the bridge architecture of FIG. 5. In what follows, with reference to FIG. 6, a layer hierarchy of upper layer entities of the control plane and the data plane will be described in detail.

Referring to FIG. 6, upper layer entities of the control plane includes physical network topology, active topology, VLAN topology and/or station location.

As shown in FIG. 2, physical network topology describes a physical connection configuration among LANs, bridges, and bridge ports. Here, a bridge port corresponds to the part, which connects the LAN and the bridge, through which bilateral transmission of Ethernet frames (or MAC frames) may be performed between the LAN and the bridge. This connection is implemented through a wired connection, and the physical network topology only represents a relationship among physical connections.

Active topology does not allow a loop to occur within a network, namely makes the network an active network in a loop-free status, which may be accomplished by activating or deactivating (or blocking) the status of a specific bridge port. If a loop is created within a bridged network, the same data is repeatedly copied within the bridge, thereby degrading the functionality of the bridge and making the MAC address table within the bridge unreliable. Also, if a loop is created when data is transmitted by using a broadcast function, data is broadcast continuously within the network; therefore, a phenomenon called a broadcast storm may paralyze the network. Therefore, in a bridged network, an interconnection relationship among stations connected to bridges has to be activated through active topology in order not to cause a loop to be created, and various algorithms have to be prepared to this purpose.

When an active network in a loop-free status is formed through active topology, a VLAN topology may configure, by using the aforementioned VIDs, a protocol through which data may be transmitted among VLANs of the same VID. After the VLAN topology is configured, individual MAC addresses belonging to the respective VLANs may be stored through station location, and a route that enables communication between stations may be formed. In this way, if a route to each station is determined, desired data may be forwarded through the relay of a bridge.

The process for forming the aforementioned topology may employ separate protocols for individual steps of the process performed one after another; however, depending on embodiments, one single protocol may exist, which constructs the active topology up to station location at the same time.

While the steps described above are related to forming a bridged network, the relay of a bridge represents operation of the bridge itself due to the data plane. In the bridge relay, data received through an input port of the bridge is forwarded to the output port and transmitted through the output port, where the data goes through several steps within the bridge. Detailed descriptions of the data transmission will be described later.

Meanwhile, after the active topology is formed, transmission capability between a port of the bridge and a port of a neighboring bridge may be measured, and stream reservation may be made possible. The aforementioned operation will be described in detail with reference to FIGS. 8 and 9.

Figure 7:
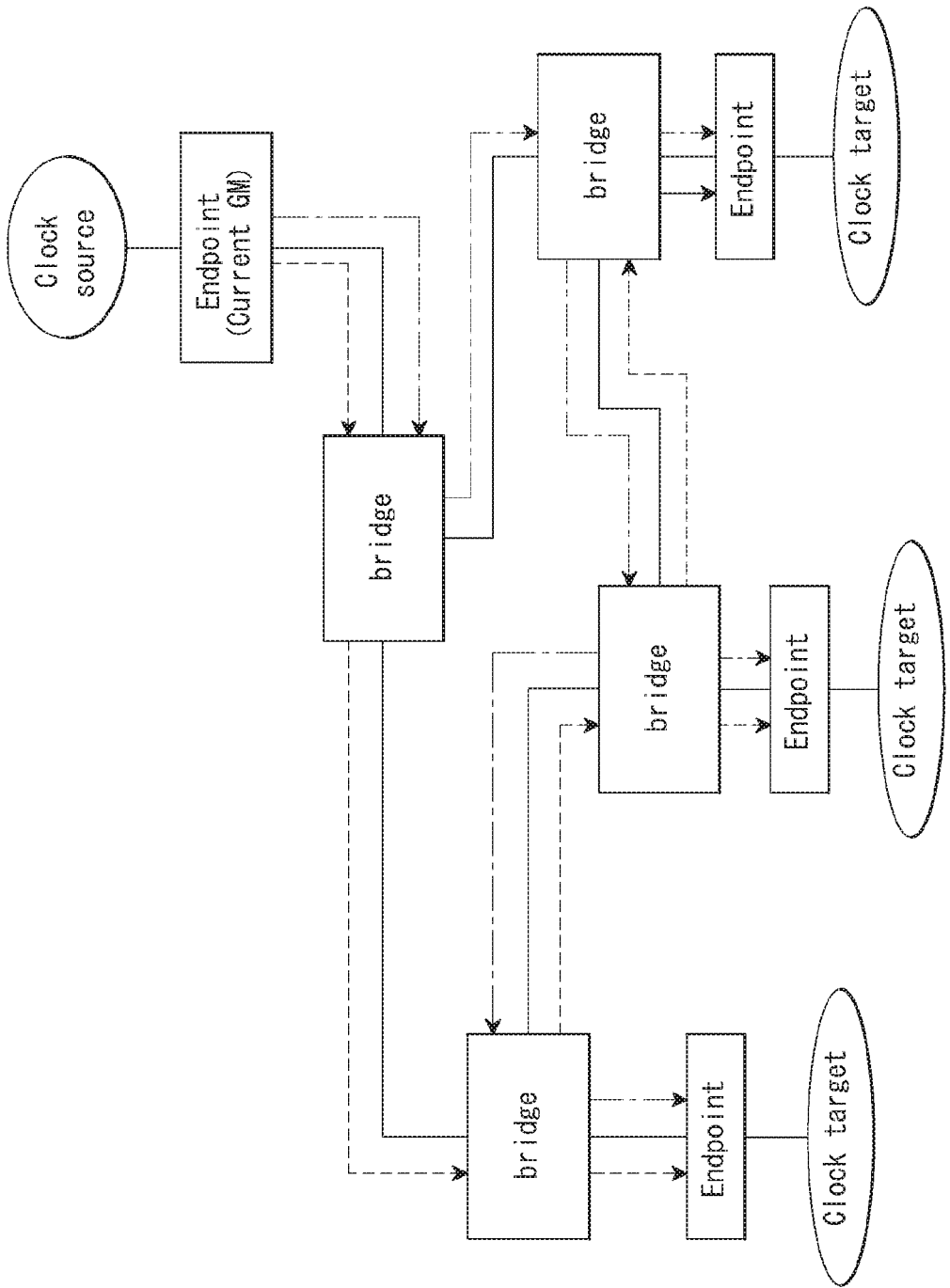
FIG. 7 illustrates a time synchronization method of a bridged network according to one embodiment of the present invention.

FIG. 7 illustrates a time synchronization method of a bridged network according to one embodiment of the present invention.

As described with reference to FIG. 6, when active topology is formed by using an arbitrary, single protocol or a plurality of protocols, a time synchronization operation may be performed among connected bridges. Time synchronization is performed to synchronize clocks of the bridges within the network and end points, which act as a final device, and enable transmission of time-sensitive frames. Through the time synchronization, it is possible to configure a time-sensitive network. As an embodiment, the IEEE 1588 protocol, which is known as a default protocol for time synchronization, may be used, but the present invention is not limited to the specific embodiment.

To describe a time synchronization process, bridges and end points (or stations) within the network may perform clock synchronization by exchanging messages periodically with a grandmaster (GM) clock. Through clock synchronization, except for the GM clock, all of the bridges and end points within the network may know their offset with respect to the GM clock, and time synchronization is possible based on the offset information. At this time, as an embodiment, among various clocks within the network, one with the best quality may be selected as the GM clock.

In one embodiment, the GM clock may be determined by using the Best Master Clock Algorithm (BMCA) that finds a clock exhibiting the best quality across the whole network. In other words, by using the BMCA algorithm, one of the clocks included in the individual stations (for example, bridges and end stations) within the whole bridged network may be determined as the GM clock. In another embodiment, the GM clock may be determined by the user's selection. In other words, without involving an algorithm such as BMCA, one clock may be determined as the GM clock based on the selection of the user.

In the embodiment of FIG. 7, the bridged network may perform time synchronization via two different routes to ensure clock redundancy. In this case, since time information is relayed through two different routes from one GM clock, even if one of the two routes is not activated for some reason, it is possible to perform time synchronization quickly through the other route.

In an additional or alternative embodiment, a method for setting an additional clock source may be used to ensure clock redundancy. In this case, if a first GM clock fails, a second clock source may be activated. By doing so, an advantage is obtained that when the first GM clock does not work, the pre-configured, second clock source in a waiting status may be selected as the GM clock, and time synchronization may be performed quickly without requiring time for searching for an alternative best GM clock again.

If the first embodiment shown in FIG. 7 is to ensure redundancy by employing redundancy routes, the second embodiment corresponds to have redundancy of clock sources. Both of the two embodiments may be a measure for ensuring fault tolerance.

Figure 8:
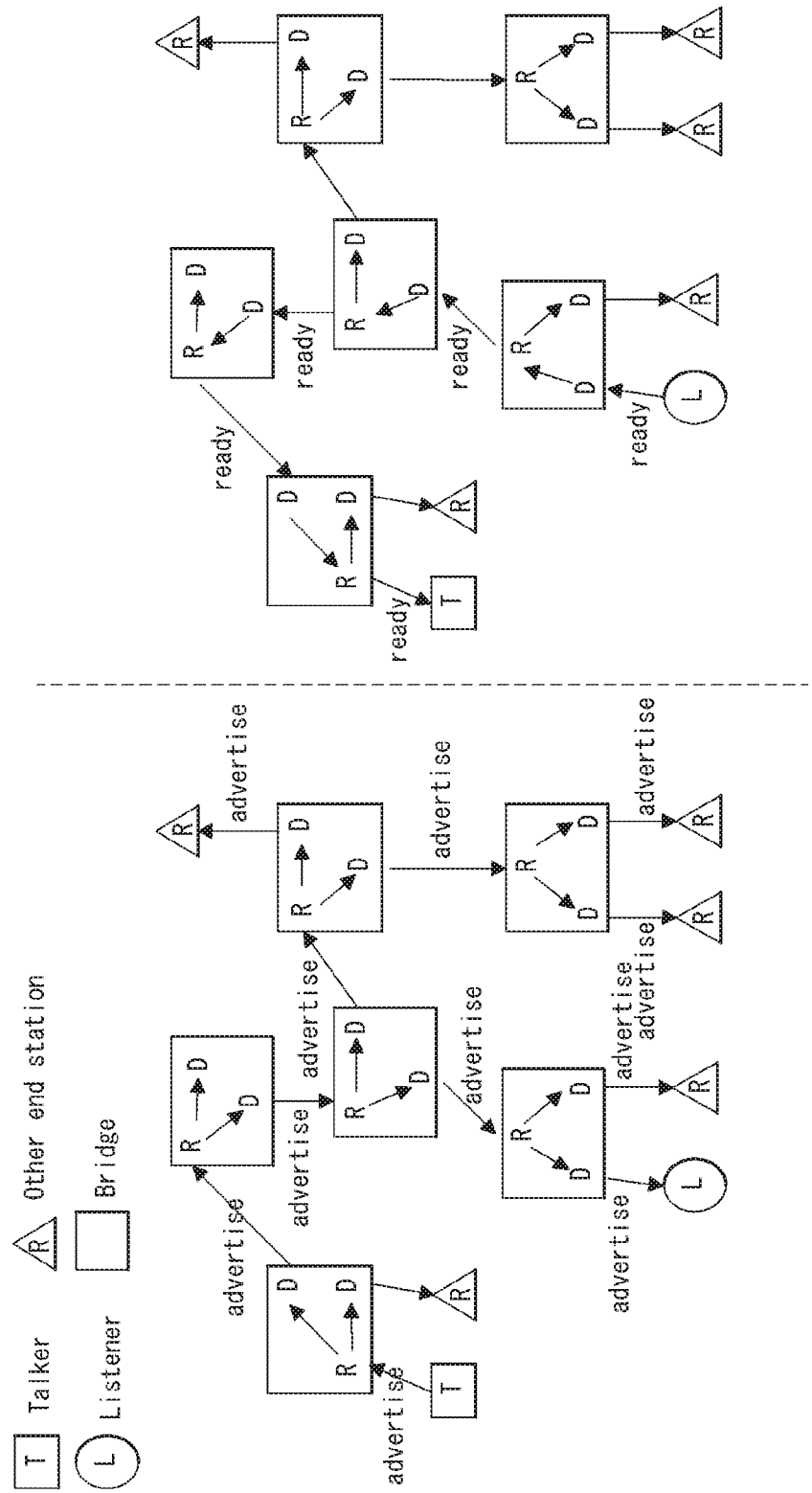
FIG. 8 illustrates a stream registration and stream reservation method according to one embodiment of the present invention.

FIG. 8 illustrates a stream registration and stream reservation method according to one embodiment of the present invention. In the present specification, a stream refers to unidirectional flow of data from a talker to one or more listeners. Here, a talker indicates a source of the stream or an end station, which is the producer of the stream while a listener indicates a destination of the stream or an end station, which is a receiver or a consumer of the stream.

As an embodiment, stream registration and reservation may be an operation belonging to the VLAN topology and station location among upper layer entities of the control plane described above. In the stream registration and reservation process, a route is established between a talker which attempts to send a stream through the bridged network and a listener which attempts to receive the stream, and whether frames may be transmitted via the route by using desired bandwidth and within a given time latency may be calculated. If a given condition is satisfied, frames may be transmitted via the route. By doing so, since frames may be transmitted within a desired time boundary without congestion loss, QoS may be ensured.

In the embodiment of FIG. 8, 'R' and 'D' represent the status of a bridge port, where 'R' denotes a registration status, and 'D' denotes a declaration status. If the status of a bridge port becomes the registration status, the bridge forwards received frames to other output ports except for itself, and the output ports, which have received the frames, enter the declaration status. While the process is performed, the MAC destination address and membership of the VLAN may be registered to the database of each port.

For registration of a stream, as shown in the left part of FIG. 8, a talker may first send a "talker advertise" message across the whole bridged network to which the talker belongs. As an embodiment, the talker advertise message may include information about a source MAC address, destination MAC address, stream ID, data rate and/or latency level. Here, the stream ID denotes an identifier for identifying a stream that a source (or talker) wants to transmit.

As an embodiment, each time the talk advertise message passes a bridge, the worst case latency may be calculated. If resources may not be secured while the talker advertise message is forwarded, the corresponding station may relay a "talker failed" message, which contains a code denoting a cause of the failure, to the listener.

If resources may be secured, and the listener has succeeded to receive the talker advertise message, the listener may send a "listener ready" message to the talker. In this case, as shown in the right part of FIG. 8, the listener ready message may be relayed in the reverse direction of the route along which the talker advertise message has been relayed from the talker to the listener. When the listener ready message is relayed, the talker may transmit a stream along the route, which guarantees QoS. After transmission of the stream is completed, a de-registration procedure is performed, and reserved bandwidth and route may be released.

If accumulated maximum latency, namely worst-case latency, included in a message transmitted to the station does not satisfy the QoS expected by the listener, the corresponding station may relay a "listener asking fail" message to the talker. Here, the station may be a concept including a bridge or end station.

Figure 9:
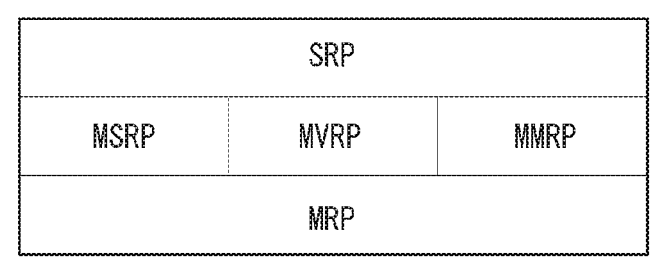

FIG. 9 illustrates architecture for stream registration and reservation of FIG. 8. More specifically, FIG. 9 illustrates a protocol (stream registration and reservation protocol) used for stream registration and reservation by the control plane of the bridge architecture of FIG. 5.

In the present specification, the stream registration and reservation procedure may be performed to the needs of the user, and when the procedure is used, up to 75% of the bandwidth may be allocated for the talker and the listener. In the allocated route, since frames of the corresponding talker have priority, the frames may receive less influence from other frames. Therefore, the stream registration and reservation method may be used for such applications requiring guaranteed QoS and smaller latency. For example, if the stream registration and reservation method is used for synchronizing video and audio data with each other, it is possible to synchronize them with each other while QoS is guaranteed at the same time.

Referring to FIG. 9, the stream registration and reservation protocol includes Multiple Registration Protocol (MRP), Multiple Stream Registration Protocol (MSRP), Multiple VLAN Registration Protocol (MVRP), Multiple MAC Registration Protocol (MMRP), and Stream Registration Protocol (SRP). MSRP protocol, MVRP protocol, and MMRP protocol correspond to applications of the MRP protocol.

SRP protocol operates based on the MSRP, MVRP, and MMRP protocols. As an embodiment, a station within a bridged network may perform the stream registration and reservation procedure by using the whole or part of the functions of the protocol of FIG. 9.

Multiple Registration Protocol (MRP) protocol refers to the protocol used for declaring attributes of a port. The MRP protocol is used by a bridge or end station to store stream ID, VLAN ID, MAC address, and so on to each port by using the MSRP, MVRP, and MMRP protocols corresponding to the applications of the MRP protocol, and thereby a network may be constructed efficiently.

MVRP protocol is used to register several VLAN IDs or VLAN memberships to a bridge port, and MMRP protocol is used to register several MAC addresses to the bridge port. By using the MVRP and MMRP protocols, multicast may be performed within a bridge. MSRP protocol allows all of the processes including transmission of a talker advertise message for registration of a stream by the talker as described with reference to FIG. 8, transmission of a talker failed message when a station fails to secure resources, and transmission of a listener ready message when resources are secured.

As an embodiment, MRP protocol uses a flooding method, and when the MRP protocol is used, a Multiple Registration Protocol Data Unit (MRPDU) message is generated and transmitted periodically to other bridge or end station. Here, the flooding method refers to a method by which data received by each station is relayed to all of the output ports except for input ports. MRPDU is a message corresponding to the second layer (layer 2) described above, namely a message corresponding to the data area of the MAC PDU used in the data link layer; when MRPDU is actually transmitted within a bridge, a source address, destination address, VLAN tag, and so on may be attached to the MDRPDU.

For example, when the network is started for the first time, and data is transmitted to a particular bridge, no prior information is given about to which port data has to be transmitted in order to arrive at a destination. In this case, if MRPDU is received, the bridge stores the source address of the MRPDU to the input port and transmits the MRPDU to all other available output ports except for the input port.

If an address value is stored in the input port as described above, when an end station having the corresponding address as a destination address transmits data afterwards, data may be transmitted by referring to the address value stored in the port of the bridge without having to perform flooding. In other words, if a routing table describing which address value is connected to (or associated with) which port within a bridge is defined, data may be transmitted efficiently. MMRP protocol is a protocol, which enables each port of a bridge to store an address value associated with the corresponding port as described above. In the same way, MVRP protocol enables each port of a bridge to store a VLAN ID associated with the corresponding port while MSRP protocol enables each port of a bridge to store a stream ID associated with the corresponding port.

MSRP protocol is a signaling protocol and transmits data called MSRPDU to perform the protocol. MSRP protocol enables a network resource to be reserved among end points and allows transmission and reception with desired QoS between a talker and a listener.

The address value, VLAN ID, and stream ID that pass through one port and are forwarded to the next bridge or end station may well have a plurality of values, and if filtering is performed on the data within a network based on the values, the network may be utilized efficiently. It is also possible to reserve a resource among end stations and to perform transmission, which satisfies desired latency (QoS) in a reserved interval. MMRP, MVRP, and MSRP protocols are all capable of supporting the operation above.

SRP protocol operates based on the MMRP, MVRP, and MSRP protocol; and defines a field called an SR class in the MSRPDU to enable transmitted streams to be identified. In other words, SRP protocol may specify features of a stream supposed to pass a reserved route by defining fields such as SRclassID, SRclassPriority, and SRclassVID within the MSRPDU. At this time, SRclassID field is intended for identifying the corresponding stream among various streams transmitted from a talker, SRclassPriority field is intended for allocating priority to the SR traffic class, and SRclassVID field is intended for identifying a VLAN for the SR traffic class.

Figure 10:
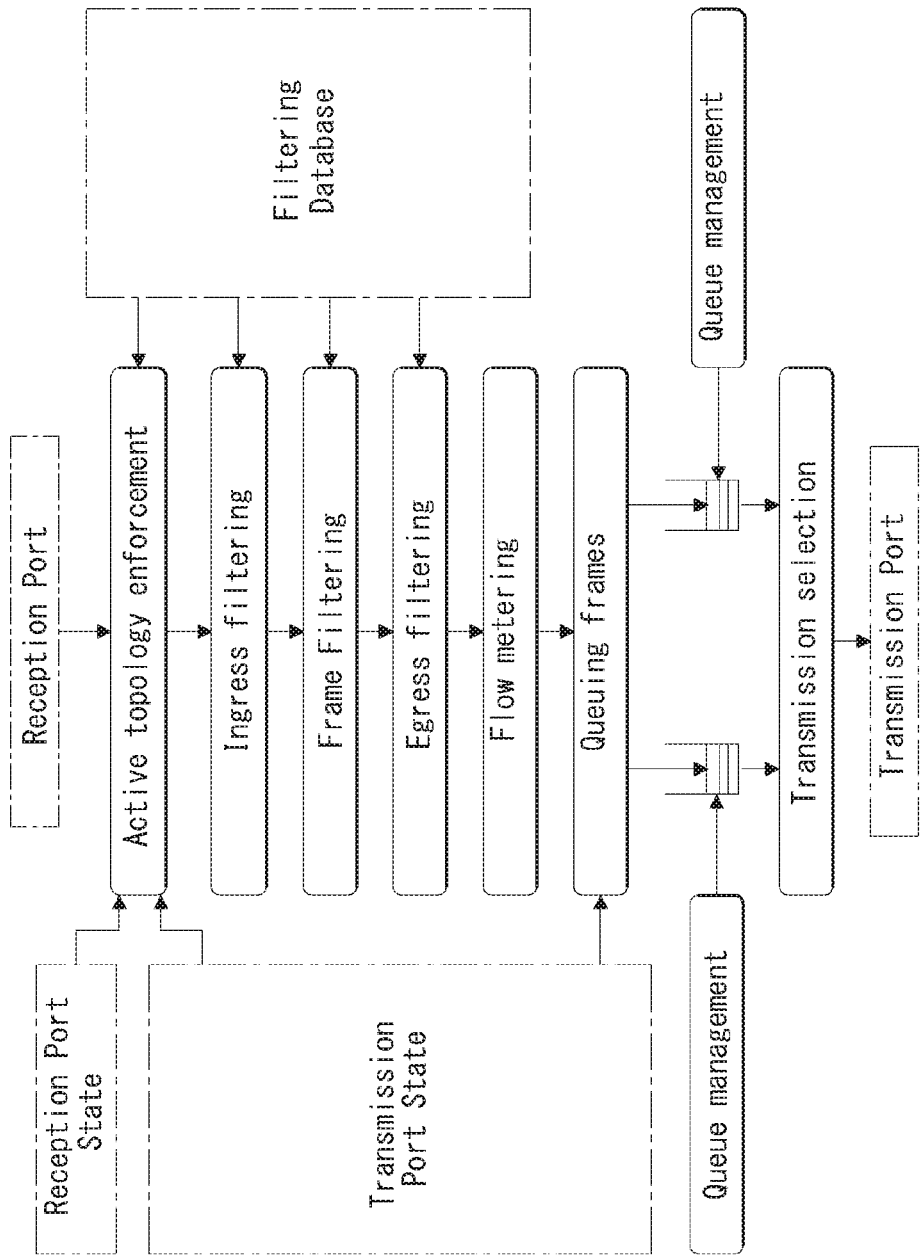
FIG. 10 illustrates a bridge forwarding process according to one embodiment of the present invention.

FIG. 10 illustrates a bridge forwarding process according to one embodiment of the present invention. As an embodiment, FIG. 10 illustrates a forwarding process of a bridge performed by the data plane of the bridge architecture of FIG. 5. In the present specification, the bridge forwarding process refers to a process required to relay data frames received by a reception bridge port (reception port) to an output bridge port (output port).

Referring to FIG. 10, first, when the reception port receives a data frame, active topology enforcement is performed. At this time, a bridge may have various port status through the active topology process of the control plane. As an embodiment, the port status may include a discarding status, learning status and/or forwarding status.

The discarding status refers to the status where a bridge port is disabled or blocked, in which the bridge does not forward input data. The learning status refers to the status where the bridge learns whether it is suitable to relay input data, in which the bridge may receive a data frame from a current port based on a stored source address (or destination address) and determine whether it is suitable to relay the received data frame. From the learning, the bridge may prevent an unwanted data loop from being created and prevent an unwanted MAC source address from being forwarded. The forwarding status refers to the status where data is actually relayed after the learning status is terminated.

After performing this step, a series of filtering steps (for example, ingress filtering, frame filtering and/or egress filtering) may be performed. The filtering step helps a received data frame be transmitted through a correct bridge output port by referring to the destination address and VID value stored in a filtering database. If an output port through which to transmit the data frame is determined from the filtering step, a flow metering step is performed.

In the flow metering step, the bridge may determine which frame to discard in the occurrence of congestion by using priority and Drop Eligible Indicator (DEI) value.

A frame that has passed the flow metering step may be queued in the outbound queue based on the priority of the frame. In this case, to determine in which outbound queue the corresponding frame is queued among a plurality of outbound queues, the relationship information (or mapping information) between the priority and traffic class described with reference to FIG. 4 may be used. Also, the status of each outbound queue may be monitored and managed by a queue management module.

After frames are stored in the outbound queue, the frames may be transmitted in a serial manner through the transmission selection step. While data are transmitted serially, bandwidth may be secured, and the overall network performance may be guaranteed or optimized by delaying the frames according to their traffic class, which may be referred to as traffic shaping. A device that performs the traffic shaping may be called a traffic shaper or shaper for short.

The traffic shaping may be used together with the stream reservation described above, which, in this case, enables desired QoS to be obtained.

In the bridge forwarding process above, all of the steps above may be performed, but only part of the steps may be performed depending on the embodiments. Also, the bridge forwarding process above may be performed by one or more processors within the bridge.

In what follows, a transmission selection method of a network device according to one embodiment of the present invention will be described. The transmission selection method may be one example of the transmission selection step (or method) of the bridge forwarding process of FIG. 10. As described above, the network device may correspond to a bridge within a bridged network based on the IEEE802.1 or apparatus (or system) which include the bridge or which is included therein. For example, the network device may be an MAC bridge or VLAN bridge following the IEEE802.1D or IEEE802.1Q, or apparatus (or system) including the bridge or included therein. In the present specification, descriptions applied to the bridge may also be applied to the network device in the same or in a similar way.

In the present specification, a data frame (or frame) refers to the unit of data transmitted in a network, and a data stream (or stream) refers to a data flow from one end station (for example, talker) to another end station (for example, listener). As an embodiment, one stream may include one or more frames.

Each port of a network device (or bridge) may transmit data frames based on a transmission selection algorithm supported by a queue corresponding to the traffic class and port. In other words, a network device may select and transmit frames out of a queue based on the transmission selection algorithm supported for each queue within a port.

At this time, when the network device satisfies a preconfigured condition, it may select and transmit (or output) frames from a queue based on the transmission selection algorithm. For example, the network device may select and transmit frames from the corresponding queue based on the transmission selection algorithm "if the transmission selection algorithm supported by the corresponding queue determines that there are frames which may be transmitted" or "if the transmission selection algorithm supported by each queue corresponding to the traffic class having a numerically higher priority supported by the corresponding port determines that there is no frame which may be transmitted".

Such an algorithm for transmission selection (transmission selection algorithm) may include, for example, strict priority transmission selection algorithm or credit-based shaper transmission selection algorithm. Meanwhile, an additional transmission selection algorithm, selectable by a management means within a bridged network, may be supported as an implementation option as long as the corresponding requirement is satisfied.

The strict priority transmission selection algorithm (in what follows, "strict priority algorithm") is a default algorithm for selecting a transmission frame, which has to be supported by all of the network devices. If a queue supporting the algorithm includes one or more frames, the network device may transmit frames according to the strict priority algorithm. In this case, the order according to which frames are transmitted from the queue follows a predetermined ordering requirement. As an embodiment, the predetermined ordering requirement may be first-in-first-out (FIFO) order.

The credit-based shaper transmission selection algorithm (in what follows, "credit-based shaper algorithm") corresponds to an algorithm which may be optionally supported in addition to the strict priority algorithm. If a queue supporting the algorithm includes one or more frames, and transmitAllowed parameter is true, the network device may transmit frames according to the credit-based shaper algorithm. As an embodiment, the transmitAllowed parameter is associated with a queue supporting the credit-based shaper algorithm; if the value of a credit parameter (credit value) of a transmission credit currently available from the queue is 0 or positive, the transmitAllowed parameter has a true value, whereas, if the credit parameter value is negative, the transmitAllowed parameter has a false value. A credit-based shaper (CBS) operating according to the credit-based shaper algorithm will be described in detail with reference to FIG. 11.

Figure 11:
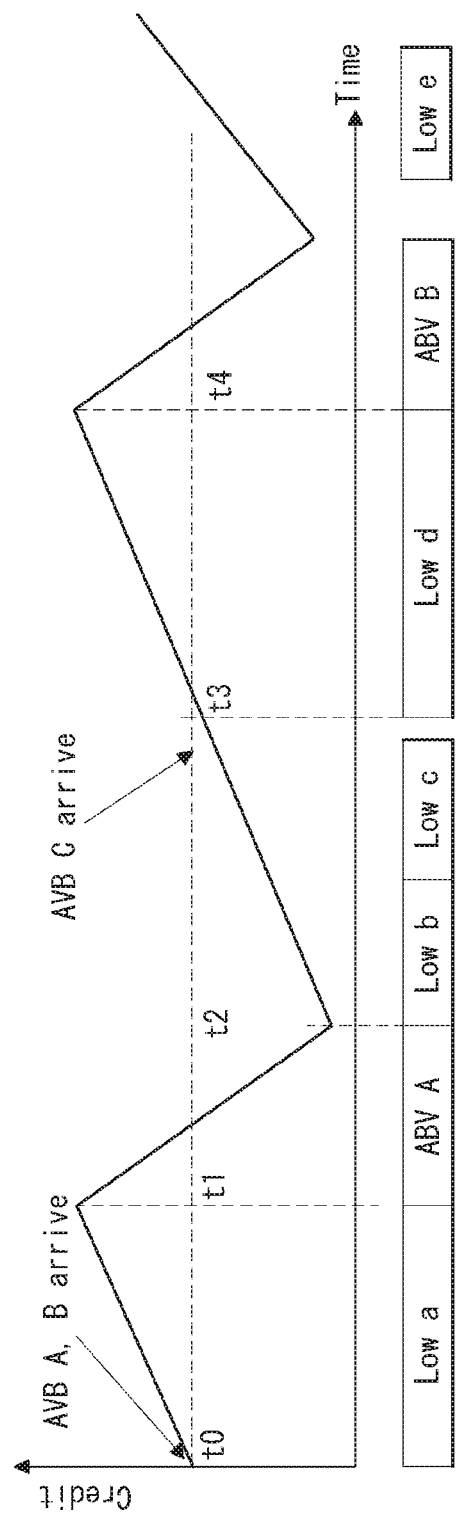
FIG. 11 illustrates operation of a network device using a credit-based shaper according to one embodiment of the present invention.

FIG. 11 illustrates operation of a network device using a credit-based shaper according to one embodiment of the present invention.

A credit-based shaper refers to a shaper operating according to the credit-based shaper algorithm among the transmission selection algorithms used in a bridged network of the IEEE802.1. As an embodiment, a credit-based shaper is a shaper used in the conventional Audio Video Bridging (AVB) system, for which data may be transmitted within predetermined latency only when it is used together with a stream reservation protocol (SRP).

In a network where the credit-based shaper is used, two SR classes called class A and class B are defined, which correspond to the third and second priority of a traffic shaper, respectively. The SR class selected as above may have bounded latency.

When the credit-based shaper is used, the priority values of class A and class B correspond only to the third and the second highest values among the priority values ranging from 0 to 7; if the priority values are associated with the highest two traffic classes, the priority values may be treated as having the highest priority value in the transmission selection step. In FIG. 11, AVB A, B, and C frame are assumed to belong to the same SR class (for example, SR class B). As described above, the traffic class of an AVB frame belonging to the SR class is higher than the traffic class of other frames (for example, Low a, b).

As described above, in the credit-based shaper, a transmission credit (credit) may be a parameter which indicates whether an AVB frame may be transmitted or not; if the credit value is larger than or equal to 0, the value of transmitAllowed parameter becomes true, and thereby AVB frames may be transmitted whereas, if the credit value is less than 0, the value of transmitAllowed parameter becomes false, which renders transmission of AVB frames impossible. If the credit value is less than zero, a frame having different priority rather than the AVB frame may be transmitted. In what follows, with reference to FIG. 11, operation of a network device using the credit-based shaper will be described.

As shown in FIG. 11, since other frame (Low a) is being transmitted at time t0 when AVB frame A and B arrive at a queue, the network device is unable to transmit AVB A and B. In this case, credit is gradually increased. Since credit is larger than zero at t1 when transmission of the frame (Low a) is completed, the network device is allowed to transmit AVB frame (A). While AVB frame (A) is transmitted, credit is gradually decreased. Since credit is less than 0 at t2 when transmission of AVB frame (A) is completed, the network device is unable to transmit AVB frame (B), but other frames (Low b, Low c) belonging to a different traffic class are transmitted. Since credit is still less than zero at t3 when AVB frame C arrives at the queue, the network device is unable to transmit AVB frame (B or C), but other frame (Low d) belonging to a different traffic class may be transmitted. While a frame having different priority is transmitted, credit is gradually increased. Since credit is larger than zero at t4 when transmission of the frame (Low d) is completed, the network device may transmit AVB frame (B).

If transmission selection is performed as described above, even if AVB frame A and B are received at the same time, AVB frame (A) and AVB frame (B) may be output being separated in time from each other as shown in FIG. 11. Through this operation, the network device may receive frames and prevent data from being input to the queue for AVB frames of the network device in a burst manner.

In the network based on the IEEE 802.1 standard, various shapers (or traffic shapers) may be used in addition to the aforementioned credit-based shaper. Although various traffic shapers have their own uses different from each other, most of them are intended to prevent data from being input in a burst manner to the queue associated with one traffic class at a particular time within the network. When data are input into one queue in a burst manner, frame loss may be occurred due to limitation of a queue size, and if the queue size of a bridge is set large to avoid frame loss, latency may be increased inadvertently. Therefore, to perform time-critical data processing, it is important that for most cases, data have to be transmitted to the next station at regular intervals or in a time-distributed manner in a bridged network by using a traffic shaper.

However, in a specific bridged network, for example, in an automotive bridged network, some end stations may require a burst data input for energy efficient data processing rather than time-critical data processing. In this case, in a network device connected to the corresponding end station, instead of using the commonly used transmission selection method, it may be necessary to use a new transmission selection method capable of outputting burst data for energy-efficient data processing. In what follows, a new transmission selection method (or algorithm) for outputting burst data and a network device using the method will be described with reference to a related drawing. In the present specification, a transmission selection method for outputting burst data may also be called a burst transmission method (or algorithm). Also, a port of the bridge to which the burst transmission method is provided may be called a burst bridge port.

In the present specification, that burst data is being output does not mean that a set (or group) of data (or data frames) in the same traffic class (or priority) are output being distributed in time but that a set (or group) of such data frames are output continuously, where a set (or group) of data frames output in this manner may be called burst data. At this time, each data frame within a set of data frames output continuously may be output at intervals less than a predetermined time spacing.

As an embodiment, if a network device uses a burst transmission method, burst data may be output in such a way that the network device continuously outputs, for example, all of the first data frames within an outbound queue corresponding to the first traffic class and provides the first burst data to an end station connected to the network device, after which the network device continuously outputs all of the second data frames within an outbound queue corresponding to the second traffic class having priority lower than the first traffic class and provides the second burst data to an end station connected to the network device.

Figure 12:
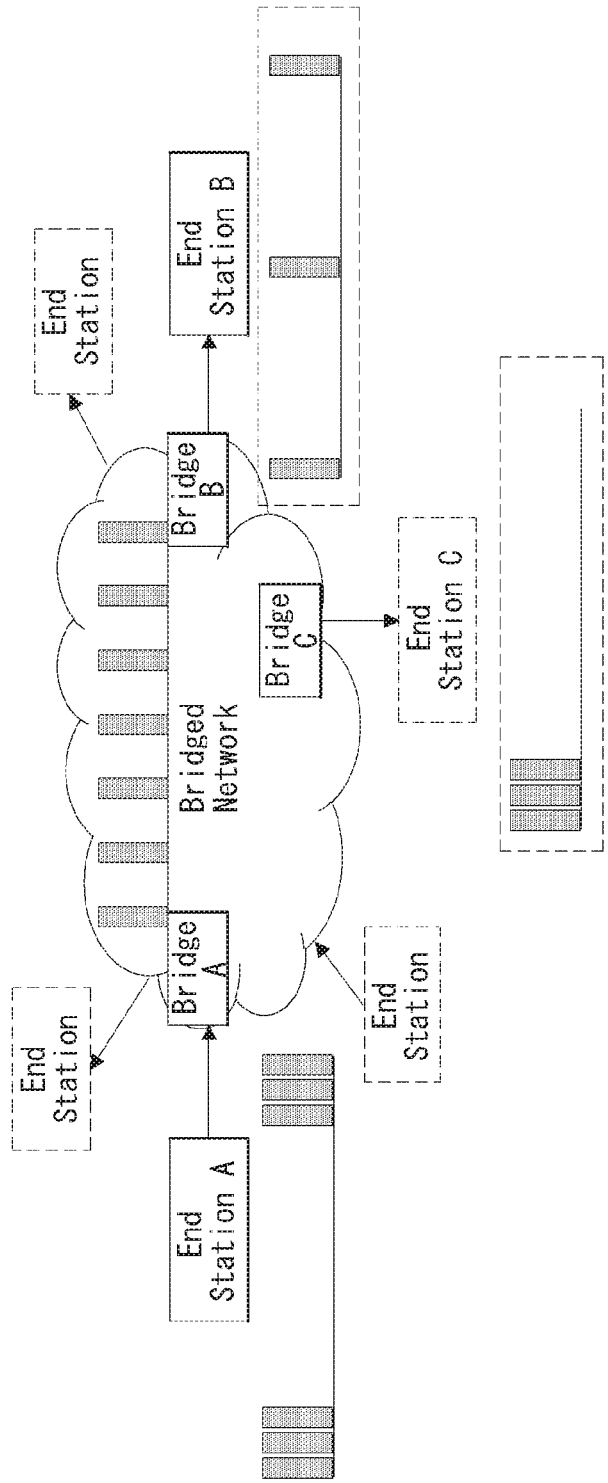
FIG. 12 illustrates a bridged network including a network device according to one embodiment of the present invention.

FIG. 12 illustrates a bridged network including a network device according to one embodiment of the present invention. As an embodiment, the bridged network of FIG. 12 may be an in-vehicle bridged network. For in-vehicle bridged networks, efficient use of energy is one of very important problems to be solved.

Referring to FIG. 12, a bridged network includes a plurality of network devices (for example, bridges). A specific network device within the bridged network is connected to an end station, and such a network device may be referred to as a boundary network device (for example, boundary bridge).

As shown in FIG. 12, even if an end station A, which is a source device, provides burst input data, when the burst input data go through an ordinary traffic shaper of network devices (for example, bridge A, B, C) within the bridged network, the data input to the end station B, which is a final destination, are received being distributed in time. However, a specific end station, for example, end station C may want the data to be received in a burst manner for efficient use of energy. For example, end station C may be an in-vehicle application sensor that requires burst data input. In this case, a boundary network device (for example, bridge C) connected to the end station C has to be able to provide a transmission selection method (algorithm) for burst data output.

As described above, a specific network device, for example, a boundary network device connected to an end station has to be able to optionally provide a transmission selection method (or algorithm) for burst data output.

A burst transmission selection method may be applied to, for example, a boundary network device (boundary bridge) connected to a specific end station. As an embodiment, although a specific end station does not require latency to be within a predetermined range in terms of timing, it may only require burst data input in terms of energy efficiency. In other words, for efficient use of energy, the burst transmission selection method may be applied to a network device connected to an end station that requires burst input rather than small latency.

Figure 13:
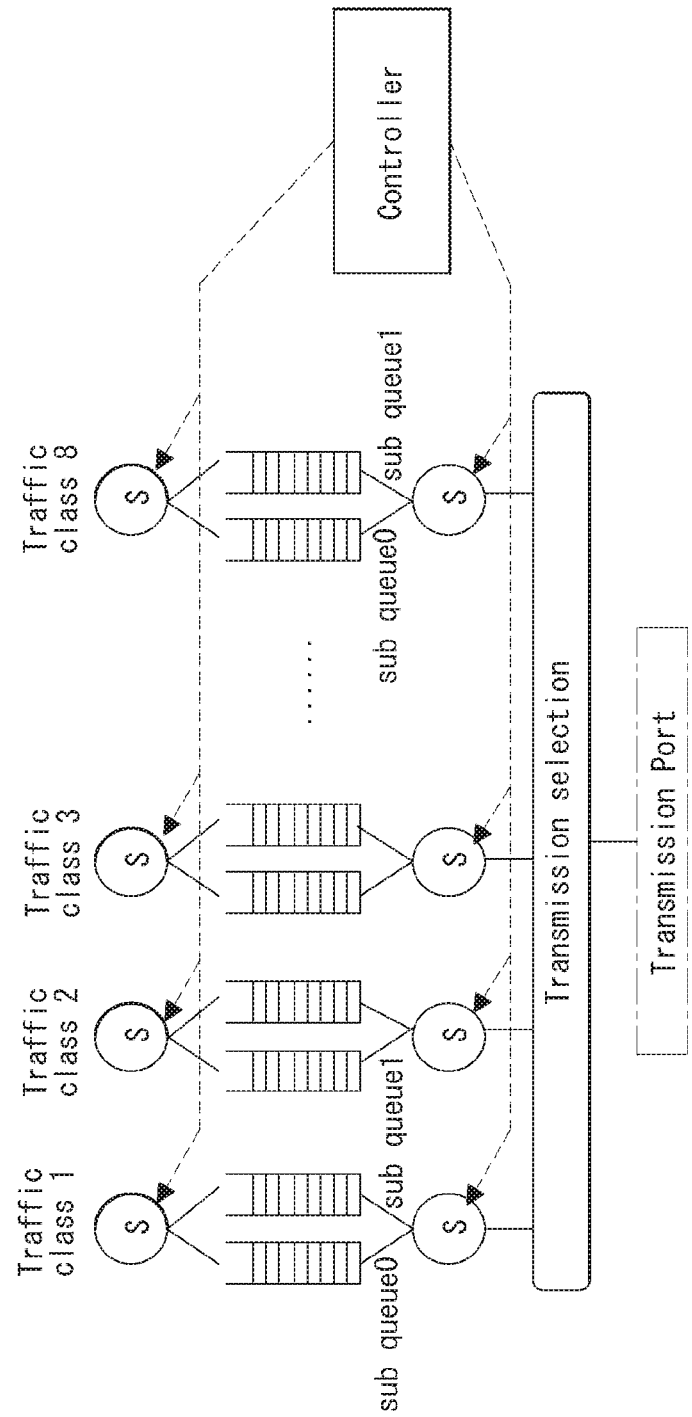
FIG. 13 illustrates a method for transmitting data based on burst transmission by a network device according to one embodiment of the present invention.

FIG. 13 illustrates a method for transmitting data based on burst transmission by a network device according to one embodiment of the present invention. The burst transmission method in the embodiment of FIG. 13 outputs burst data through reconfiguration of queues. In other words, the burst transmission method in the embodiment of FIG. 13 may use reconfigured queues.

As an embodiment, the burst transmission method may be applied to a specific port (or specific output port) of a network device (for example, boundary bridge) connected to an end point within a bridged network. As an embodiment, the burst may be applied to the entire queues of a specific port of the network device. In other words, the burst transmission method may be applied in a port unit differently from other types of transmission selection methods applied in units of queues (or traffic class units). In this case, the bridge ID and port ID (or output port ID) of the corresponding port of the network device to which the burst transmission method is applied are management information of the network, which may be registered or stored in a management information database.

As an embodiment, based on the bridge ID and port ID, a network device may determine whether a specific port of a bridge is a port to which the burst transmission method is applied. For example, the network device may search a database (for example, management information database) for a transmission selection algorithm (or method) table for the corresponding port based on the bridge ID and port ID; and determine whether the corresponding port is a port to which the burst transmission method is applied.

Here, the transmission selection algorithm table for a specific port refers to the table which allocates a transmission selection algorithm to each traffic class (or queues associated with the traffic class) supported by the specific port. By referring to the transmission selection algorithm table, the network device may obtain information about the transmission selection algorithm applied to individual traffic classes (or queues) of the specific port, which will be described in detail below with reference to FIG. 16.

When the corresponding port of a boundary bridge is a port to which the burst transmission method is applied, the network device may reconfigure the queues (or outbound queues) of the corresponding port. As an embodiment, reconfiguration of queues may be performed before or after the burst transmission method is applied to the corresponding port.

As an embodiment, the network device may reconfigure each of the outbound queues of an output port to which the burst transmission method is applied as two sub-queues in a predefined structure. For example, the network device may reconfigure each of the outbound queues of a burst output port as one pair of sub-queues in a ping-pong structure. For example, as shown in FIG. 13, the outbound queue 1 associated with traffic class 1 may be reconfigured into sub-queue 0 and sub-queue 1; in the same way, outbound queues 2 to 8 associated with the respective traffic classes 2 to 8 may also be reconfigured into sub-queue 0 and sub-queue 1. As an embodiment, such a reconfiguration of outbound queues may be performed by the processor (or controller) of the network device.

The reconfigured one pair of sub-queues (for example, sub-queues in the ping-pong structure) may have different operation status. For example, if one sub-queue is in a read status, the other sub-queue forming a pair with the sub-queue may be in a write status. At this time, if a sub-queue in the read status changes its status to the write status, a sub-queue in the write status may be changed to the read status. Through this operation, an output port of a bridge, instead of performing a read/write operation together or simultaneously in one queue, may be reconfigured as one pair of sub-queues performing different operations, and the read operation and write operation may be performed separately. As an embodiment, selection and modification of operation status of one pair of reconfigured sub-queues may be performed by selectors (S) connected to the respective queues controlled by the processor (or controller) of the network device; however, the present invention is not limited to the embodiment above, and selection and modification may be performed by the processor (or controller) itself.

In one embodiment, the reconfigured two sub-queues may have the same size. In other words, size of each sub-queue may be one-half of the queue size. In this way, even if operation status of each sub-queue is changed, a network device may have a sub-queue in the write status, the size of which exceeds a predetermined range. By doing so, loss of input frames due to size change of sub-queues may be minimized. However, depending on embodiments, reconfigured two sub-queues may have different sizes from each other.

A network device may store data frames in a sub-queue in the write status. As an embodiment, based on mapping information between priority of a data frame and traffic class of a queue, the network device may determine in which sub-queue to store the data frame among a plurality of sub-queues. In this case, the network device may refer to a priority-class mapping table as shown in the embodiment of FIG. 4.

The network device may determine whether a preconfigured condition for status change is satisfied. Here, the condition for status change refers to the condition for changing operation status of a sub-queue.

In one embodiment, if one of sub-queues in the write status is completely filled with data frames, the network device may determine that the condition for status change has been met. In another embodiment, if one of sub-queues in the write status is filled with data frames more than a preconfigured size (or threshold size), the network device may determine that the condition for status change has been satisfied. As an embodiment, the threshold size may be set to be larger than half the size of a sub-queue in the write status. For example, the threshold size may be set to be 80% of the size of a sub-queue in the write status.

As an embodiment, the network device may determine whether a preconfigured condition for status change is satisfied within a predetermined period (or threshold period). Here, the preconfigured threshold period refers to a time-out period in which one sub-queue is waiting to be filled. As one embodiment, the threshold period may be configured based on the size of a sub-queue. For example, as the size of a sub-queue becomes large, a shorter threshold period may be configured.

When the burst transmission method is performed, the time delay until a burst output comes out depends on the size of a sub-queue. In other words, when size of a sub-queue is small, burst data is output frequently; on the other hand, if size of a sub-queue is large, the time period during which burst data is output becomes relatively longer. At this time, if one of sub-queues takes too much time to be filled with data frames, time to produce burst output will subsequently be delayed. This may cause performance degradation of the network due to excessive time delay even if the burst transmission method may be applied to a network device connected to an end station which does not require boundary latency.

Therefore, depending on embodiments, a network device of the present invention may change the queue status only when the condition for status change is satisfied within a predetermined threshold period and output burst data from the queue, which has been changed to the read status. Meanwhile, if the condition for status change is not satisfied within a predetermined threshold period, the network device may output data from a queue currently in the read status without changing the queue status or may change the queue status and output data from the queue, which has been changed to the read status. This output data may not be the type of burst data desired by the end station. However, since output data may be produced within a predetermined time-out period, an advantage is obtained that a problem due to excessive delay may be solved.

If a preconfigured condition for status change is satisfied, the network device may change the status of the entire sub-queues. Through this operation, sub-queues in the read status may be changed to the write status, and sub-queues in the write status may be changed to the read status.

If the preconfigured condition for status change is not satisfied, the network device may maintain the status of the entire sub-queues. In this case, the network device may select data frames for transmission from sub-queues currently in the read status.

The network device may select data frames for burst transmission from sub-queues, which have been changed to the read status. As an embodiment, a method for the network device to select data frames for burst transmission from a sub-queue in the read status may be the same as or similar to the method for selecting data frames for transmission from a sub-queue in the read status by using the strict priority algorithm (or method). For example, the network device may select data frames for burst transmission from a sub-queue sequentially according to traffic classes by using a method for selecting all of the data frames for transmission, which are stored in a sub-queue with the highest traffic class in the read status, and then selecting all of the data frames for transmission, which are stored in a sub-queue with the second highest traffic class in the read status. At this time, the order of outputting data frames from the same sub-queue follows a predefined method.

As described above, being controlled by a traffic class to which the largest amount of data is input, the burst transmission method outputs data from a queue; however, the burst transmission method puts priority to the frames having the highest priority (or traffic class) within the burst output. Also, the burst transmission method renders queue control simple, and since reconfiguring each queue into sub-queues in the form of ping-pong type may also be processed by software, an advantage may be obtained that the implementation difficulty is reduced.

Figure 14:
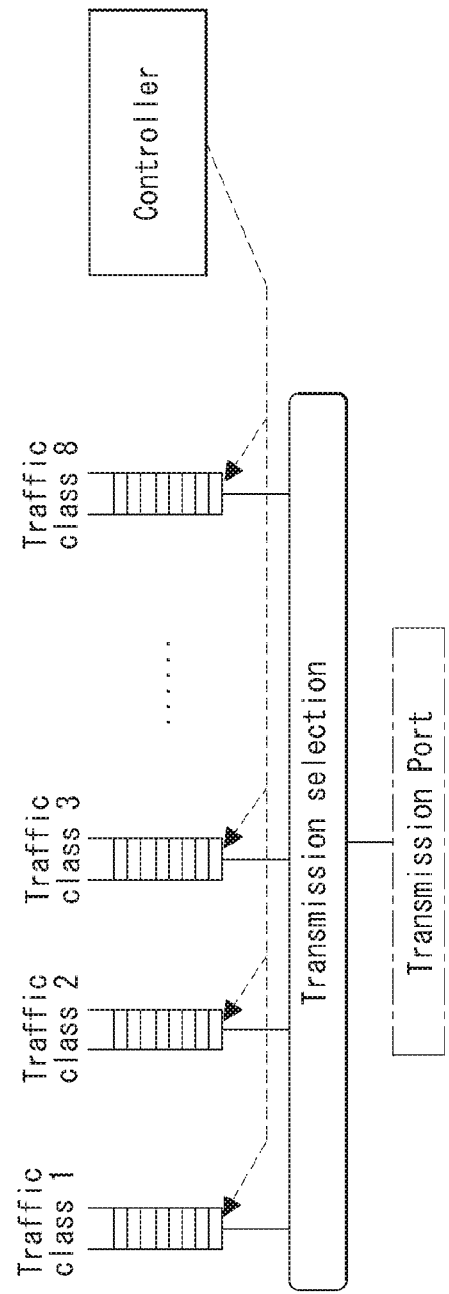
FIG. 14 illustrates a method for transmitting data based on burst transmission by a network device according to another embodiment of the present invention.

FIG. 14 illustrates a method for transmitting data by using a burst transmission method by a network device according to another embodiment of the present invention. The burst transmission method of the embodiment of FIG. 14 may output burst data without reconfiguration of queues. In other words, the burst transmission method of the embodiment of FIG. 14 may be such kind of burst transmission method that does not use reconfigured queues.

Different from the burst transmission method according to the embodiment of FIG. 13, when the burst transmission method according to the embodiment of FIG. 14 is used, the network device may output burst data by changing operation status of each queue without reconfiguring each queue into sub-queues. Compared to a method of reconfiguring each queue into sub-queues, the method of FIG. 14 provides an advantage that memory may be utilized in a more efficient manner; however, it also brings a disadvantage that a reference size (or threshold size) has to be managed adaptively to change the status of each queue in order to prevent a frame loss from being occurred due to overflow of the queue while burst data is output.

In the embodiment of FIG. 14, each queue may operate in a first status (or write status). The queue in the first status may perform only the write operation. In other words, in this case, a process for selecting a data frame for transmission through the read operation may not be performed. Through this operation scenario, time for filling up at least one of the queues with a sufficient amount of burst data may be ensured.

When a preconfigured first condition for status change is satisfied, a network device may change the status of the entire queues from the first status to the second status (or read/write status). Here, the first condition for status change refers to a condition for changing the status of a queue from the write status to a status where both of the read and write operation are allowed. In other words, a queue in the second status may perform both of the read and write operation.

In one embodiment, when one of the queues in the first status are filled with data frames more than a preconfigured reference size, the network device may determine that the first condition for status change has been satisfied. As an embodiment, the reference size may be configured independently for each queue.

In another embodiment, when a first reference time preconfigured in the first status is passed, the network device may determine that the first condition for status change has been satisfied. As an embodiment, the first reference time may be configured based on the size of a queue. As an embodiment, the reference time may be configured independently for each queue.

If a queue operates in the second status, the network device may perform a process for selecting a data frame for burst transmission. At this time, according to the method described in FIG. 13, the network device may select and output data frames for burst transmission from the queue. As an embodiment, whether a process for selecting data frames for transmission from each queue is performed may be determined by the processor (or controller) of the network device.

Afterwards, when a preconfigured second condition for status change is satisfied, the network device may change the status of the entire queues from the second status to the first status. Here, the second condition for status change refers to a condition for changing the status of a queue from read/write status to the write status. As described above, queues that have been changed to the write status may perform only the write operation.

In one embodiment, when data frames are output from a preconfigured number of queues among the queues in the second status, the network device may determine that the second condition for status change is satisfied. As an embodiment, the preconfigured number may be 1 or 2. If the preconfigured number is one, when burst data are output from one of the queues in the second status, the network device may determine that the second condition for status change is satisfied. If the preconfigured number is two, when burst data are output from two of the queues in the second status, the network device may determine that the second condition for status change is satisfied. By doing so, if burst data more than a predetermine amount are output from a predetermined number of queues, the network device determines that the second condition for status change is satisfied and change the status of the queues again to the write status. Afterwards, the network device may again have time for filling up a sufficient amount of data frames to output burst data.

In another embodiment, if preconfigured second reference time is passed while being in the second status, the network device may determine that the second condition for status change is satisfied. As an embodiment, the second reference time may be configured based on the size of a queue. As an embodiment, the reference time may be configured independently for each queue. Through this operation, if burst data is output more than a predetermine time period, the network device may determine that the second condition for status change is satisfied and change the status of the queue again to the write status. Afterwards, the network device may again have time for filling up a sufficient amount of data frames to output burst data.

Figure 15:
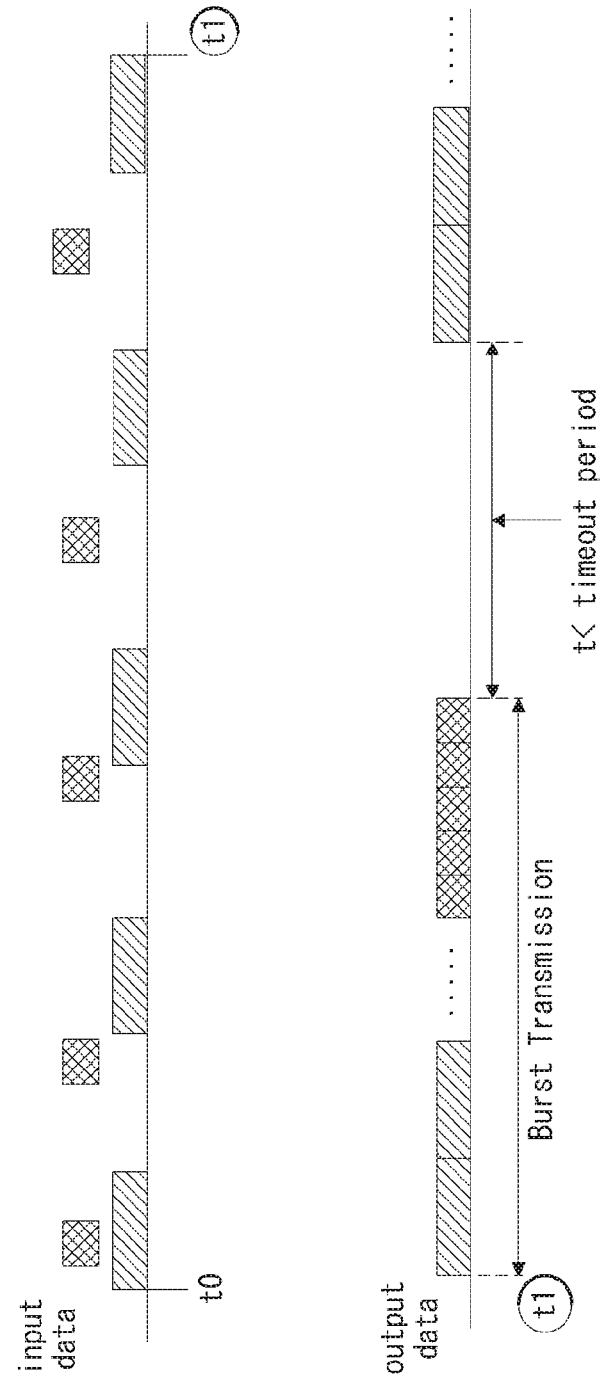
FIG. 15 illustrates types of data input and output to and from a network device when a burst transmission method according to one embodiment of the present invention is used.

FIG. 15 illustrates types of data input and output to and from a network device when a burst transmission method according to one embodiment of the present invention is used.

As shown in the upper part of FIG. 15, two types of data frames may be input to a network device. For example, a first type data frame and a second type data frame having different priorities may be input to the network device. As an embodiment, the first type data frame may be associated with a higher traffic class than the second type data frame. At this time, each data frame may be input by being distributed along the time axis.

As shown in the lower part of FIG. 15, two types of data frames input to the network device may be output as burst data through the burst transmission method (or algorithm) of FIG. 13 or 14. For example, as shown in the figure, if sub-queues corresponding to the first type data frame or the second type data frame are all filled up at time t1 that falls within a preconfigured threshold period (or reference time) from time t0, the network device may output burst data. At this time, the burst output of the first type data frame belong to a high traffic class may temporally precede the burst output of the second type data frame.

As described above, if the network device uses a burst transmission method, an end station connected to the network device may obtain burst data output, and therefore, an advantage may be obtained in terms of energy efficiency from reduction of actual operation time for data processing. However, if the network device uses a burst transmission method, a time delay is occurred until queues are filled sufficiently with data, which makes it difficult to be used for time-critical applications.

Also, as described above, a burst transmission method according to one embodiment of the present invention defines a preconfigured threshold period (or timeout period); as shown in a lower part of FIG. 15, burst data may be output within the corresponding period, and thereby performance degradation of the network due to excessive waiting or delay may be prevented.

FIG. 16 illustrates a transmission selection algorithm table according to one embodiment of the present invention. In the present specification, a transmission selection algorithm table refers to a table which provides information about a transmission selection algorithm (or method) provided by each port (or queue). By referring to the transmission selection algorithm table about the corresponding port, a network device may obtain information about a transmission selection method supported by the corresponding port (or each queue within the corresponding queue).

As described above, a transmission selection algorithm (or method) refers to an algorithm used for selecting transmission frames from the corresponding queue. The transmission selection algorithm may include various algorithms in addition to the strict priority algorithm, credit-based shaper algorithm, and burst transmission algorithm.

As an embodiment, the transmission selection algorithm table is defined for each port, which, as described above, shows a transmission selection method (or algorithm) allocated to each traffic class (or each queue associated with each traffic class) supported by the corresponding port. In this case, as shown in FIG. 16, a transmission selection algorithm for the corresponding queue may be identified by the transmission selection algorithm table by using an integer identifier.

For example, as shown in FIG. 16, if the identifier has a first value (for example, "0"), it indicates that the transmission selection algorithm is the static priority algorithm; if the identifier is a second value (for example, "1"), it indicates that the transmission selection algorithm is the credit-based shaper algorithm; if the identifier is a third value (for example, "2"), it indicates that the transmission selection algorithm is the enhanced transmission selection algorithm; and if the identifier is a fourth value (for example, "4"), it indicates that the transmission selection algorithm is the burst transmission algorithm.

Also, if the identifier has a fifth value (for example, "4-255"), it indicates that the transmission selection algorithm is reserved for a future use, and if the identifier has a sixth value (for example, "255"), it indicates that the transmission selection algorithm is a vendor-specific algorithm for DCBX. Also, if the identifier is a seventh value (for example, a 4-octet integer), it indicates that the transmission selection algorithm is a vendor-specific algorithm. In this case, the most significant 3-octet may be OUI or CID, and the lowest octet may be an integer value ranging from 0 to 255 allocated by the owner of the OUI or CID.

The transmission selection algorithm table (or transmission selection identification table) may be stored in a management information database and managed by a management means of a network device.

Figure 17:
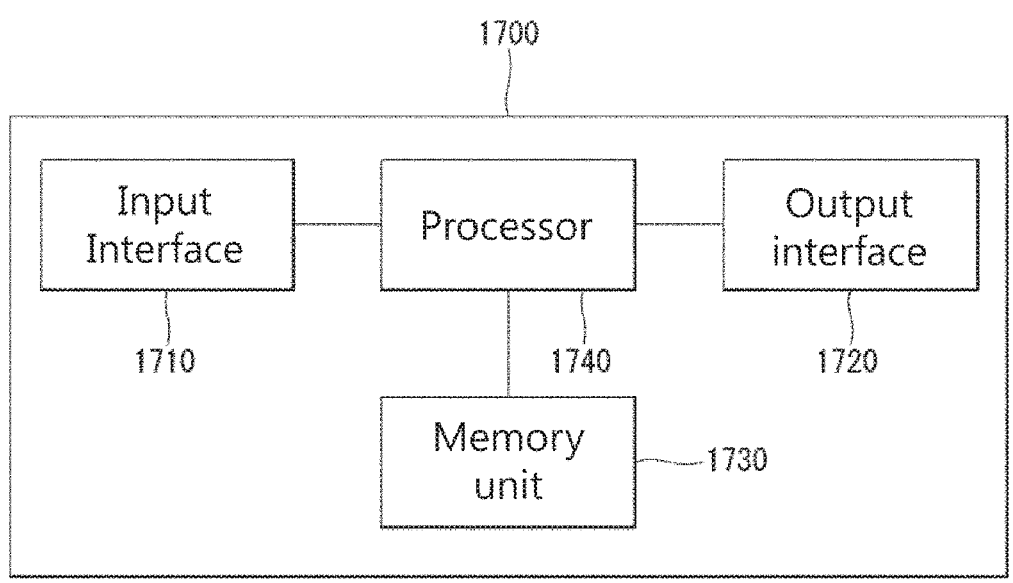
FIG. 17 illustrates a structure of a network device according to one embodiment of the present invention.

FIG. 17 illustrates a structure of a network device according to one embodiment of the present invention.

In the embodiment of FIG. 17, a network device 1700 may comprise an input interface 1710, output interface 1720, one or more memory unit 1730, and processor 1740. As described above, the network device 1700 may correspond to a bridge within a bridged network of the IEEE802.1 or a device including the bridge or included therein. For example, a network device may correspond to a bridge implemented according to the IEEE802.1D or IEEE802.1Q or a device (or system) belonging to the bridge or including the bridge. In one embodiment, a network device may perform a connectivity function for devices (or networks).

As an embodiment, the network device 1700 may include a first memory including one or more queues storing frames input through the input interface 1710 (for example, input port of ingress port). Also, the network device 1700 may further include a second memory storing at least one of a module, data, computer program command or software for implementing the operation of the network device 1700 according to various embodiments of the present invention. As an embodiment, the second memory may be installed within a memory unit 1730 which is the same as or different from the first memory.

Also, the network device 1700 may further include a third memory storing the transmission selection algorithm table of FIG. 16. As an embodiment, the third memory may be installed within a memory unit 1730 which is the same as or different from the first memory and/or second memory. For example, the first, second, and third memory may all be installed within the same memory unit 1730 or may be installed within different memory units 1730 respectively. Also, two memories may be installed in the same memory unit 1730 but the remaining one memory may be installed in a memory unit 1730 different from the aforementioned memory unit 1730.

The processor 1740 may be connected to the memory unit 1730 and configured to perform operation due to various embodiments of the present invention according to the figure and descriptions above. For example, the processor 1740 may be configured to output burst transmission through the output interface 1720 (for example, an output port or egress port) by selecting data frames by performing the burst transmission method according to one embodiment of the present invention or configured to implement the data link layer and physical layer of the IEEE802 network. In the present specification, the processor 1730 may be a concept including a controller controlling the operation of each unit of the network device 1700 of the present invention.

A specific structure of the network device 1700 of FIG. 17 may be implemented so that various embodiments of the present invention may be applied independently or two or more embodiments may be applied together. Not only the descriptions related to FIGS. 18 and 19 but also the descriptions of the specification given above may be applied to the burst transmission method of the network device 1700 shown in FIG. 17.

Figure 18:
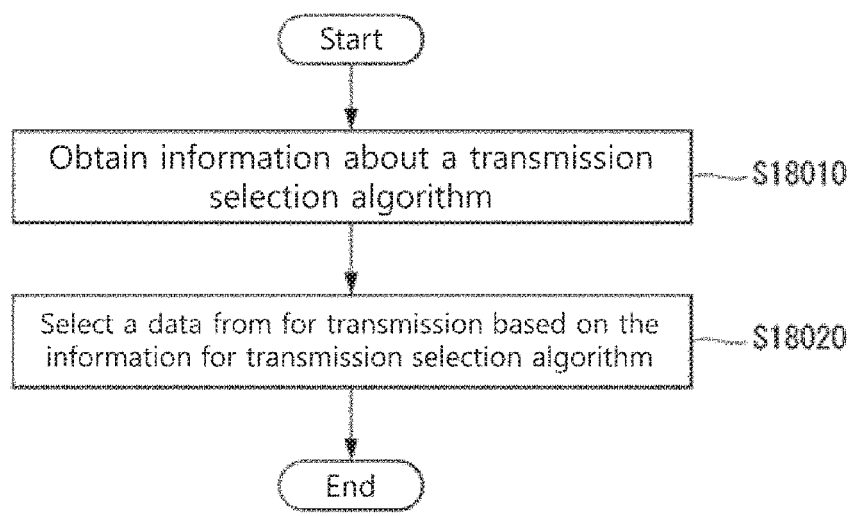
FIG. 18 is a flow diagram illustrating a transmission selection method of a network device according to one embodiment of the present invention.

FIG. 18 is a flow diagram illustrating a transmission selection method of a network device according to one embodiment of the present invention. In the embodiment of FIG. 18, a network device may include a plurality of queues storing at least one data frame. At this time, the plurality of queues may correspond to different traffic classes, respectively.

Referring to FIG. 18, a network device may obtain information about a transmission selection algorithm for a plurality of queues S18010. As an embodiment, the transmission selection algorithm may correspond to the strict priority algorithm, credit-based shaper algorithm or burst transmission algorithm.

As an embodiment, the network device may search a database (for example, management information database) for a transmission selection algorithm (or method) table for the corresponding port based on the bridge ID and port ID; and obtain transmission selection algorithm information about each of the plurality of queues (or each traffic class corresponding to each queue) within the corresponding port from the transmission selection algorithm table. As shown in FIG. 16, the transmission selection algorithm about the corresponding queue may be identified from the transmission selection algorithm table in terms of an integer identifier.

The network device may select a data frame for transmission from the corresponding queue based on the transmission selection algorithm information S18020. A method for selecting a data frame for transmission of burst data from the corresponding queue when the transmission selection algorithm is the burst selection algorithm will be described in detail with reference to FIG. 19 below.

Figure 19:
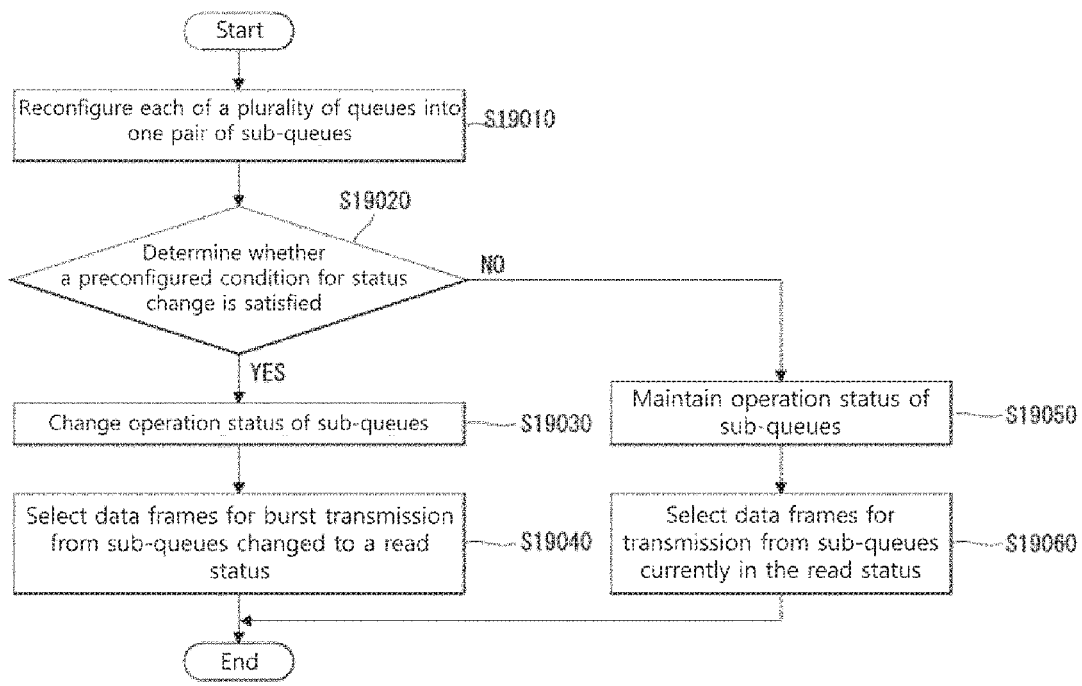
FIG. 19 is a flow diagram illustrating a transmission selection method based on a burst transmission algorithm of a network device according to one embodiment of the present invention.

FIG. 19 is a flow diagram illustrating a transmission selection method based on a burst transmission algorithm of a network device according to one embodiment of the present invention. Detailed descriptions repeated in FIGS. 12 to 18 will be omitted in the description with reference to FIG. 19.

A network device according to one embodiment of the present invention may obtain information about a transmission selection algorithm allocated to the corresponding port or each queue (or each traffic class) within the corresponding port as described in FIG. 18. At this time, the obtained transmission selection algorithm about the corresponding port or each queue (or each traffic class) of the corresponding port may be the burst transmission algorithm.

In one embodiment, the transmission selection algorithm allocated to all of the queues within the corresponding queue may be the burst transmission algorithm. In another embodiment, the transmission selection algorithm allocated to part of the queues within the corresponding port may be the burst transmission algorithm. For example, the transmission selection algorithm allocated to one or two queues among the queues within the corresponding port may be the burst transmission algorithm. In what follows, descriptions are given to the embodiment based on an assumption that a transmission selection algorithm is allocated to all of the queues within the corresponding port; however, the assumption is only an example for the convenience of descriptions, and the same or similar description may also be applied to an embodiment where a transmission selection algorithm is allocated to part of the queues within the corresponding port.

Referring to FIG. 19, if a transmission selection algorithm allocated to each of a plurality of queues is the burst transmission algorithm, a network device may reconfigure each of the plurality of queues S19010. As an embodiment, the network device may reconfigure each of outbound queues of an output port into two sub-queues in a predefined structure. For example, the network device may reconfigure each of outbound queues of an output port into one pair of sub-queues in a ping-pong structure.

As an embodiment, one pair of reconfigured sub-queues (for example, sub-queues in the ping-pong structure) may have different operation status. For example, if one sub-queue is in the read status, the other sub-queue in the pair may be in the write status. In this way, output ports of a bridge may be reconfigured into a pair of sub-queues performing different operations from each other rather than perform read and write operations together or simultaneously in a single queue, thereby performing the read and write operations separately. In one embodiment, sizes of reconfigured two sub-queues may be the same to each other. In other words, size of each sub-queue may be half the size of the corresponding queue. Since this particular feature has been described with reference to FIG. 13, detailed descriptions thereof will be omitted.

The network device may determine whether a preconfigured condition for status change is satisfied S19020. The network device may determine whether one of sub-queues in the write status satisfies the preconfigured condition for status change. In one embodiment, if one of sub-queues in the write status is completed fill up with data frames, the network device may determine that the condition for status change is satisfied. In another embodiment, if one of sub-queues in the write status is filled with data frames more than a threshold size, the network device may determine that the condition for status change is satisfied.

As an embodiment, the network device may determine whether the preconfigured condition for status change is satisfied within a preconfigured period. Here, the preconfigured period refers to a timeout period during which the network device waits for one sub-queue to be filled. As an embodiment, the timeout period may be configured based on the size of a sub-queue. Since this particular feature has been described with reference to FIG. 13, detailed descriptions thereof will be omitted.

If the preconfigured condition for status change is satisfied, the network device may change the status of the entire sub-queues S19030. By doing so, sub-queues in the read status may be changed to the write status, and sub-queues in the write status may be changed to the read status.

The network device may select a data frame for transmission of burst data from sub-queues changed to the read status S19040. As an embodiment, the network device may use the same method as one for selecting a data frame for transmission from a sub-queue in the read status by using the strict priority algorithm (or method) as a method for selecting a data frame for transmission of burst data from a sub-queue in the read status. For example, the network device may select data frames for burst transmission from a sub-queue in a sequential manner according to a traffic class in a way that all of the first data frames stored in a sub-queue in the read status belonging to a traffic class of the highest priority are selected for transmission and then all of the second data frames stored in a sub-queue in the read status belonging to a traffic class of the second highest priority are selected for transmission. Since this particular feature has been described with reference to FIG. 13, detailed descriptions thereof will be omitted.

If the preconfigured condition for status change is not satisfied, the network device may maintain the status of the entire sub-queues S19050. The network device may select data frames for transmission from sub-queues currently in the read status S19060. Since this particular feature has been described with reference to FIG. 13, detailed descriptions will be omitted.

As described above, although the burst transmission method outputs data from a queue, being controlled by a traffic class for which the largest amount of data are input, frames with the highest priority (or traffic class) are made to precede in the burst output. In other words, even though whether a condition for status change for outputting burst data is dependent on the queue that receives the largest amount of data, actual output of burst data depends on the priority of a traffic class associated with the queue. Also, the burst transmission method provides an advantage that it may be implemented with less difficulty since queue control is made simple, and reconfiguration of each queue into sub-queues in the ping-pong structure may also be processed by software.

In the present specification, descriptions have been given with respect to embodiments where the burst transmission algorithm is applied to all of the traffic classes (or queues corresponding to traffic classes) of the corresponding port; however, the descriptions are only an example, and the technical scope of the present invention is not limited to the descriptions. For example, the burst transmission algorithm may be applied to part of traffic classes (or queues corresponding to the traffic classes) of the corresponding port, and a different transmission selection algorithm (for example, strict priority algorithm and/or credit-based algorithm) may be applied to the remaining traffic classes (or queues corresponding to the traffic classes). In this case, the priority level between traffic classes to which the respective algorithms are applied may use a preconfigured value or a newly defined value. For example, traffic classes (or queues) to which the burst transmission algorithm is applied may have the highest priority level, traffic classes (or queues) to which the credit-based algorithm is applied may have the second highest priority level, and traffic classes (or queues) to which the strict priority algorithm is applied may have the lowest priority level.

The embodiments described above are combinations of constituting elements and features of the present invention in a predetermined form. Each individual element or feature has to be considered as optional except where otherwise explicitly indicated. Each individual element or feature may be implemented solely without being combined with other elements or features. Also, it is also possible to construct the embodiments of the present invention by combining part of the elements and/or features. Part of a structure or feature of an embodiment may be included in another embodiment or may be replaced with the corresponding structure of feature of another embodiment. It should be clearly understood that the claims that are not explicitly cited within the technical scope of the present invention may be combined to form an embodiment or may be included in a new claim by an amendment after application.

The embodiments of the present invention may be implemented by various means such as hardware, firmware, software, or a combination thereof. In the case of hardware implementation, one embodiment of the present invention may be implemented by using one or more of ASICs (Application Specific Integrated Circuits), DPSs (Digital Signal Processors), DSPDs (Digital Signal Processing Devices), PLDs (Programmable Logic Devices), FPGAs (Field Programmable Gate Arrays), processors, controllers, micro-controllers, and micro-processors.

In the case of implementation by firmware or software, one embodiment of the present invention may be implemented in the form of modules, procedures, functions, and the like, which perform the functions or operations described above. Software codes may be stored in the memory and activated by the processor. The memory may be located inside or outside of the processor and may exchange data with the processor by using various well-known means.

It is apparent for those skilled in the art that the present invention may be embodied in other specific forms without departing from the essential characteristics of the present invention. Therefore, the detailed descriptions above should be regarded as being illustrative rather than restrictive in every aspect. The technical scope of the present invention should be determined by a reasonable interpretation of the appended claims, and all of the modifications that fall within an equivalent scope of the present invention belong to the technical scope of the present invention.

MODE FOR INVENTION

Various embodiments have been described in their best mode for implementing the present invention.

INDUSTRIAL APPLICABILITY

The present invention is used in a range of network applications.

It should be clearly understood by those skilled in the art that the present invention may be changed or modified in various ways without departing from the technical principles and scope of the present invention. Therefore, it is intended that the present invention includes changes and modifications of the present invention defined by appended claims and provided within their equivalent scope.

What is claimed is:

1. A network device, comprising:
a plurality of queues which store at least one data frame, wherein the plurality of queues corresponds to respective traffic classes and are connected to respective ones of a plurality of ports; and
a processor connected to the plurality of queues, wherein the processor is configured to:
obtain information related to a transmission selection algorithm for the plurality of ports,
wherein a part of the plurality of ports uses a burst transmission algorithm and a reminder of the plurality of ports uses a non-burst transmission algorithm that comprises at least one of a strict priority algorithm and a credit-based shaper algorithm;
identify a set of queues for a port using the burst transmission algorithm, based on information related to the transmission selection algorithm,
wherein the set of queues includes a first queue for a first class and a second queue for a second class;
input data frames into the set of queues while the first queue is filled with at least one data frame having the first class less than a first threshold size and the second queue is filled with at least one data frame having the second class less than a second threshold size;
output at least one data frame having the first class from the first queue based on the second queue being filled with data more than a second threshold size; and
transmit the at least one data frame having the first class, wherein the first class has a priority higher than the second class.

2. The network device of claim 1,
wherein the second queue is reconfigured into a first sub-queue in a read status and a second sub-queue in a write status, and
wherein a status of the second sub-queue is changed to the read status, in response to the second sub-queue in the write status being filled with data more than the second threshold size while the first sub-queue is in the read status.

3. The network device of claim 2, wherein the processor is further configured to:
based on a first plurality of sub-queues in the read status and a second plurality of sub-queues in the write status being used, change a status of the first plurality of sub-queues and a status of the second plurality of sub-queues in response to at least one sub-queue among the first plurality of sub-queues satisfying a status-change condition within a pre-configured time period.

4. The network device of claim 2, wherein the processor is further configured to:
after the at least one data frame having the first class is outputted, output and transmit at least one data frame having the second class.

5. The network device of claim 2, wherein the first sub-queue and the second sub-queue have the same size.

6. The network device of claim 1, wherein the identified port is connected to an end station that requires a burst data input rather than a time-critical data processing.

7. A method of transmission selection of a network device including a plurality of queues storing data frames, wherein the plurality of queues corresponds to respective traffic classes and are connected to respective ones of a plurality of ports, the method comprising:
obtaining information related to a transmission selection algorithm for a plurality of ports,
wherein a part of the plurality of ports uses a burst transmission algorithm and a reminder of the plurality of ports uses a non-burst transmission algorithm that comprises at least one of a strict priority algorithm and a credit-based shaper algorithm;
identifying a set of queues for a port using the burst transmission algorithm, based on information related to the transmission selection algorithm,
wherein the set of queues includes a first queue for a first class and a second queue for a second class;
inputting data frames into the set of queues while the first queue is filled with at least one data frame having the first class less than a first threshold size and the second queue is filled with at least one data frame having the second class less than a second threshold size;
outputting at least one data frame having the first class from the first queue based on the second queue being filled with data more than a second threshold size; and
transmitting the at least one data frame having the first class,
wherein the first class has a priority higher than the second class.

8. The method of claim 7,
wherein the second queue is reconfigured into a first sub-queue in a read status and a second sub-queue in a write status, and
wherein a status of the second sub-queue is changed to the read status, in response to the second sub-queue in the write status being filled with data more than the second threshold size while the first sub-queue is in the read status.

9. The method of claim 8, further comprising:
after the at least one data frame having the first class is outputted, output and transmit at least one data frame having the second class.

10. The method of claim 8 wherein the first sub-queue and the second sub-queue have the same size.

11. The method of claim 8, wherein, based on a first plurality of sub-queues in the read status and a second plurality of sub-queues in the write status being used, a status of the first plurality of sub-queues and a status of the second plurality of sub-queues is changed in response to at least one sub-queue among the first plurality of sub-queues satisfying a status-change condition within a pre-configured time period.

12. The method of claim 7, wherein the identified port is connected to an end station that requires a burst data input rather than a time-critical data processing.

* * * * *